(12) United States Patent
Kaji et al.

(10) Patent No.: US 7,022,638 B2
(45) Date of Patent: Apr. 4, 2006

(54) METHOD AND APPARATUS FOR MANUFACTURING A FUEL CELL ELECTRODE

(75) Inventors: Yoshifumi Kaji, Okazaki (JP); Masashi Murate, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 321 days.

(21) Appl. No.: 10/235,931

(22) Filed: Sep. 6, 2002

(65) Prior Publication Data

US 2003/0054225 A1  Mar. 20, 2003

(30) Foreign Application Priority Data

Sep. 17, 2001 (JP) ............................. 2001-281382
Jun. 6, 2002 (JP) ............................. 2002-165826

(51) Int. Cl.
*H01M 4/88* (2006.01)
*B05D 5/12* (2006.01)

(52) U.S. Cl. .................. 502/101; 427/115; 156/237; 118/244; 118/308; 118/310; 118/314

(58) Field of Classification Search ............... 118/244, 118/308, 310, 314, 624, 324; 429/42, 44; 427/115; 502/101; 156/237
See application file for complete search history.

(56) References Cited

U.S. PATENT DOCUMENTS 4,044,175 A * 8/1977 Coxon et al. ............ 118/310 X
4,382,875 A * 5/1983 Solomon .................... 502/101
4,603,060 A * 7/1986 Mitsuda et al. ............. 427/115
4,933,211 A * 6/1990 Sauvinet et al. ......... 118/308 X
5,312,701 A * 5/1994 Khasin et al. .......... 427/115 X
5,738,905 A * 4/1998 Bevers ....................... 427/115
5,948,199 A * 9/1999 McGrew ................ 156/237 X
6,095,082 A * 8/2000 Belt et al. ................... 118/308
6,190,476 B1 * 2/2001 Seecharan et al. ...... 427/172 X
6,202,945 B1 * 3/2001 Yasuda et al. .............. 239/704
6,627,035 B1 * 9/2003 Fan et al. ............... 427/115 X

FOREIGN PATENT DOCUMENTS

| DE | 195 48 422 A1 | 9/1997 |
| DE | 696 08 632 T2 | 2/2001 |
| JP | A 3-295168 | 12/1991 |
| JP | A 9-180728 | 7/1997 |
| JP | A 11-288728 | 10/1999 |
| WO | WO 96/37003 | 11/1996 |

* cited by examiner

Primary Examiner—Stephen J. Kalafut
(74) Attorney, Agent, or Firm—Oliff & Berridge PLC

(57) ABSTRACT

In the method and apparatus for manufacturing a fuel cell electrode, electrode material is electrostatically held on a photosensitive drum with a prescribed pattern. The electrode material of the prescribed pattern is then transferred from the photosensitive drum onto an electrolyte membrane or a membrane of a diffusion layer. The transferred electrode material of the prescribed pattern is then fixed to the membrane. The electrode material may be electrostatically applied to the membrane a plurality of times in order to vary the electrode structure in the thickness direction.

42 Claims, 22 Drawing Sheets

METHOD AND APPARATUS FOR MANUFACTURING A FUEL CELL ELECTRODE

INCORPORATION BY REFERENCE

The disclosures of Japanese Patent Applications Nos. 2002-165826 filed on Jun. 6, 2002 and 2001-281382 filed on Sep. 17, 2001, each including the specification, drawings and abstract, are incorporated herein by reference in their entireties.

BACKGROUND OF THE INVENTION

1. Field of the Invention

The invention relates to a method and apparatus for manufacturing an electrode for a polymer electrolyte fuel cell.

2. Description of Related Art

A polymer electrolyte fuel cell is formed as a stack including a lamination of cells (cell lamination), terminals (electrode plates), insulators, end plates, a fastening member (e.g., a tension plate). More specifically, the cell lamination is formed by laminating a plurality of membrane-electrode assemblies (MEAs) and separators. A terminal (electrode plate), an insulator and an end plate are provided at both ends of the cell lamination in the laminating direction. A fastening member tightens the cell lamination in the laminating direction, and is provided outside the resultant cell lamination so as to extend in the laminating direction. Each MEA is formed from an electrolyte membrane, an anode provided on one surface of the electrolyte membrane, and a cathode provided on the other surface thereof. The electrolyte membrane is formed from an ion-exchange membrane. The anode and cathode have a catalyst layer. Diffusion layers are respectively provided between the catalyst layers and the separator. Each separator has fluid passages for supplying a fuel gas (hydrogen) and an oxidizing gas (oxygen; usually air) to a corresponding anode and cathode, respectively.

In the polymer electrolyte fuel cell, the following reactions occur at the anode and cathode: at the anode, hydrogen ions and electrons are produced from hydrogen. The hydrogen ions thus produced travel toward the cathode through the electrolyte membrane. On the other hand, at the cathode, water is produced from oxygen, hydrogen ions and electrons (the electrons are produced at the anode of an adjacent MEA and then reach the cathode through the separator, or produced at the anode of the cell located at one end of the cell lamination and reach the cathode through external circuit).

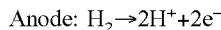

Anode: $H_2 \rightarrow 2H^+ + 2e^-$

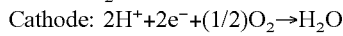

Cathode: $2H^+ + 2e^- + (1/2)O_2 \rightarrow H_2O$

A commonly used electrolyte membrane has a thickness of about 10 to 100 μm. Each catalyst layer has a thickness of about 1 to 10 μm. The catalyst layer is applied to both surfaces of the electrolyte membrane or one surface of the diffusion layer (which is formed from carbon paper or carbon cloth).

An electrode (anode, cathode) material may be applied to the electrolyte membrane by any of the following methods:

A. a wet application method for directly applying the electrode material to the electrolyte membrane by printing, roller coating, spraying or the like;

B. a method for applying a catalyst layer to a polytetrafluoroethylene sheet or the like, attaching this catalyst layer to the electrolyte membrane by heat transfer (hot pressing), and then removing the polytetrafluoroethylene sheet; and C. a special application method disclosed in Japanese Patent Laid-Open Publication No. 3-295168, that is, a method for electrostatically attaching an electrode material of a fuel cell to the whole surface of the electrolyte membrane.

However, the above direct application methods A, B have the following problems:

A. The direct application method is based on a wet application method in which an electrode material, that is, carbon powder having a noble metal attached thereto, is dissolved or suspended in a solvent such as isopropyl alcohol, ethanol or xylene for application. Since the solvent may alter the electrolyte membrane or may cause swelling and shrinking thereof, cracks are likely to be generated in the applied electrode layer.

Moreover, depending on the kneading conditions of the electrode material and the solvent, the electrode material and the solvent may not be uniformly kneaded, thereby possibly producing lumps of carbon powder and thus making uniform application difficult.

Moreover, it is impossible to produce an electrode having an arbitrary shape or an electrode with its structure (such as concentration) varied depending on the regions within a prescribed shape.

B. In the wet application method, the catalyst layer applied to a sheet is transferred to the electrolyte membrane. This method requires the transfer step. This increases the number of steps and also complicates the manufacturing process, causing increase in costs. Moreover, it is impossible to produce an electrode having an arbitrary shape or an electrode with its structure (such as concentration) varied depending on the regions within a prescribed shape.

The method of Japanese Patent Laid-Open Publication No. 3-295168 is based on a dry application method. Therefore, unlike a wet application method, cracks or the like are not generated in the electrode due to the reaction between a solvent and the electrolyte membrane and swelling and shrinking of the electrolyte membrane caused by the solvent. However, the above method cannot produce an electrode having an arbitrary shape and an electrode with its concentration varied depending on the regions within a prescribed shape and/or with its composition varied in the thickness direction of the electrode.

SUMMARY OF THE INVENTION

It is an object of the invention to provide a method and apparatus for manufacturing a fuel cell electrode, which are capable of manufacturing an electrode in a dry method and capable of manufacturing an electrode having an arbitrary shape and an electrode having its concentration and the like varied depending on the regions within a prescribed shape.

It is another object of the invention to provide a method and apparatus for manufacturing a fuel cell electrode, which are capable of manufacturing an electrode having its composition varied in the thickness direction of the electrode.

A first aspect of the invention relates to a method for manufacturing a fuel cell electrode. This method includes the steps of applying a powdery electrode material to a rotary element with a prescribed pattern, transferring the applied electrode material from the rotary element onto a target membrane, and fixing the transferred electrode material to the target membrane.

A second aspect of then invention relates to a method for manufacturing a fuel cell electrode. This method includes the steps of pressing a powdery electrode material contained in a screen drum whose surface is at least partially formed from mesh by using a squeegee provided within the screen drum, thereby directly applying the electrode material with a prescribed pattern to a target membrane through the mesh region of the screen drum, and fixing the applied electrode material to the target membrane.

A third aspect of the invention relates to an apparatus for manufacturing a fuel cell electrode. This apparatus includes a first transfer section including a rotary element and an applying device that applies a powdery electrode material with a prescribed pattern to a surface of the rotary element. The rotary element transfers the applied electrode material to a target membrane. This apparatus further includes a fixing section including a fixing device that fixes the transferred electrode material to the target membrane.

A fourth aspect of the invention relates to an apparatus for manufacturing a fuel cell electrode. This apparatus includes an electrode-material supplying/applying device that supplies a powdery electrode material and directly applies the electrode material with a prescribed pattern to a target membrane, and a fixing device that fixes the applied electrode material to the target membrane.

In the method and apparatus for manufacturing a fuel cell electrode according to the above aspect, an electrode material is applied with a prescribed pattern to a rotary element or a membrane (in the above method, the electrode material may be first transferred from the rotary element onto an intermediate medium membrane and then transferred from the intermediate medium membrane onto a membrane). Therefore, varying the prescribed pattern enables fabrication of an electrode having an arbitrary shape and an electrode having its concentration or the like varied depending on the regions within a prescribed shape. Moreover, in the above manufacturing method and apparatus, a powdery electrode material is applied to a drum or a membrane. In other words, the above manufacturing method and apparatus are based on a dry application method. Therefore, unlike a wet application method, cracks or the like are not generated in the electrode due to the reaction between a solvent and the electrolyte membrane and swelling and shrinking of the electrolyte membrane caused by the solvent.

A fifth aspect of the invention relates to a method for manufacturing a fuel cell electrode. This methods includes the steps of electrostatically retaining electrode material on a photosensitive element in a prescribed pattern, transferring the electrode material of the prescribed pattern from the photosensitive element onto a target membrane, and fixing the transferred electrode material of the prescribed pattern to the target membrane.

A sixth aspect of the invention relates to an apparatus for manufacturing a fuel cell electrode. This apparatus includes a photosensitive element, a charging element that charges a surface of the photosensitive element, a projector that projects light onto the surface of the photosensitive element other than a region corresponding to a prescribed pattern in order to eliminate static electricity therefrom, a material supply device that supplies electrode material to the surface of the photosensitive element, a member that allows a target membrane between the member and the photosensitive element and presses the target membrane against the photosensitive element, and a fixing device that fixes the electrode material to the target membrane.

In the method and apparatus for manufacturing a fuel cell electrode according to the fifth and sixth aspects, an electrode material is applied with a prescribed pattern to the surface of the photosensitive element and transferred to the target membrane (in the above method, the electrode material may be first transferred from the rotary element onto an intermediate medium membrane and then transferred from the intermediate medium membrane onto the target membrane). Therefore, varying the prescribed pattern enables fabrication of an electrode having an arbitrary shape and an electrode having its concentration or the like varied depending on the regions within a prescribed shape. Moreover, in the above manufacturing method and apparatus, a powdery electrode material is applied to the surface of the photosensitive element or transferred to the target membrane. In other words, the above manufacturing method and apparatus are based on a dry application method. Therefore, unlike a wet application method, cracks or the like are not generated in the electrode due to the reaction between a solvent and the electrolyte membrane and swelling and shrinking of the electrolyte membrane caused by the solvent.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
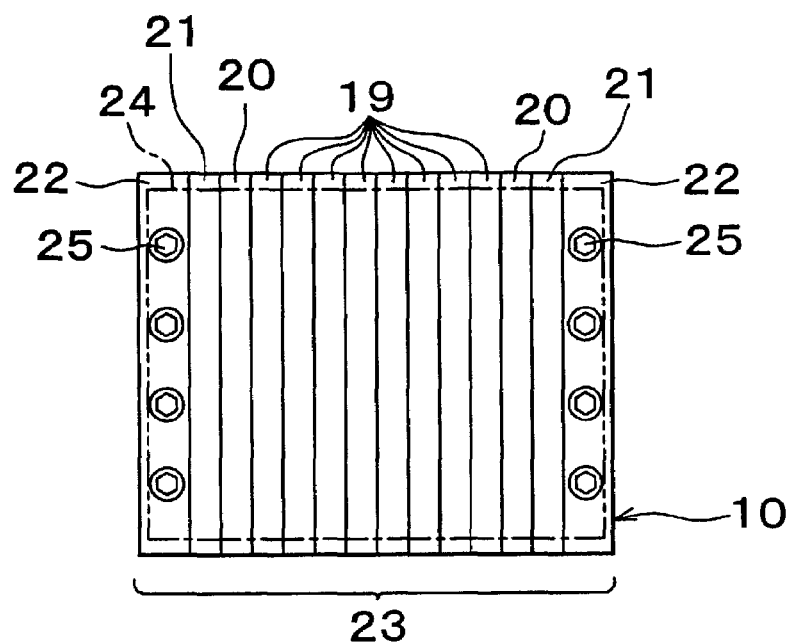
FIG. 1 is a front view showing the overall structure of a fuel cell having electrodes manufactured by a manufacturing method according to an embodiment of the invention.

Hereinafter, a method and apparatus for manufacturing a fuel cell electrode according to the invention will be described with reference to FIGS. 1 to 24.

The components that are common to the embodiments of the invention are denoted with the same reference numerals and characters.

Hereinafter, the components common to the embodiments of the invention will be described in terms of their structures and effects with reference to FIGS. 1, 2 (fuel cell), FIG. 3 (electrostatic copying type), FIG. 18 (screen and squeegee type), FIG. 21 (screen and squeegee type; and a powdery electrode material is applied directly to a membrane), FIG. 22, and FIG. 23 (a powdery electrode material).

First, the structure of a polymer electrolyte fuel cell 10 will be described with reference to FIG. 1. The fuel cell 10 has electrodes manufactured by the method and apparatus for manufacturing a fuel cell electrode according to the invention. For example, the fuel cell 10 is mounted on a fuel cell car. However, the fuel cell 10 may alternatively be used in vehicles other than automobiles.

Figure 2:
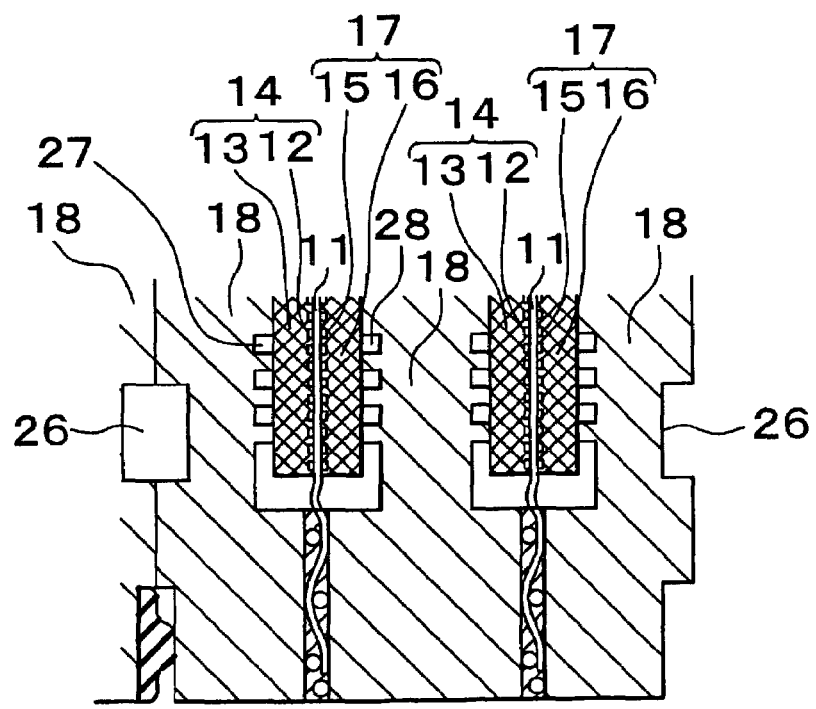
FIG. 2 is an enlarged cross-sectional view of a unit cell in FIG. 1.

Referring to FIGS. 1 and 2, the polymer electrolyte fuel cell 10 is formed as a stack 23 including a lamination of cells 19 (cell lamination), terminals 20 (electrode plates), insulators 21, end plates 22, a fastening member (tension plate 24) and bolts 25. More specifically, the cell lamination is a lamination of a plurality of cells 19 formed by laminating a plurality of membrane-electrode assemblies (MEAs) and separators 18. A terminal 20 (electrode plate), an insulator 21 and an end plate 22 are provided at both ends of the cell lamination in the laminating direction. A fastening member (tension plate 24) tightens the cell lamination in the laminating direction, and is provided outside the resultant cell lamination so as to extend in the laminating direction. The cell lamination is then fixed with the fastening member (tension plate 24) and bolts 25. An anode 14 has a catalyst layer 12 and a cathode 17 has a catalyst layer 15. Each MEA includes an electrolyte membrane 11, an anode 14 provided on one surface of the electrolyte membrane 11, and a cathode 17 provided on the other surface thereof. The electrolyte membrane 11 is formed from an ion-exchange membrane. Each separator 18 has a fuel gas passage 27 and an oxidizing gas passage 28 for supplying a fuel gas (hydrogen) and an oxidizing gas (oxygen; usually air) to a corresponding anode 14 and cathode 17, respectively. Diffusion layers 13 or 16 are provided between the catalyst layers 12, 15 and the separator 18, respectively. The separator 18 also has a refrigerant passage 26 for allowing a refrigerant (usually, cooling water) for cooling the cell to flow therethrough.

The catalyst layers 12, 15 are formed by applying a powdery electrode material to both surfaces of the electrolyte membrane 11 or by applying the powdery electrode material to one surface of each diffusion layer 13 or 16. The electrode material includes carbon powder carrying a catalytic noble metal (e.g., Pt), and an electrolyte. The electrode material is an electrically conductive, but non-magnetic material. The electrode material is different from the toner for a copying machine in that it is non-magnetic.

An apparatus 1 for manufacturing a fuel cell electrode has electrode material supply devices 33, 34 or electrode material supply devices 41, 42, a drum 30 and a fixing device 35. The electrode material supply devices 33, 34 and the electrode material supply devices 41, 42 supply a powdery anode electrode material 12P or a powdery cathode electrode material 15P as shown in FIG. 3 or 18. The supplied electrode material 12P or 15P is applied with a prescribed pattern to the surface of the drum 30, and the drum 30 transfers the applied electrode material 12P or 15P to a target membrane (the electrolyte membrane 11 or a membrane formed from the diffusion layer 13 or 16). The fixing device 35 fixes the transferred electrode material 12P or 15P to the target membrane.

The electrode material 12P or 15P may be applied to the drum 30 either electrostatically or non-electrostatically.

Figure 19:
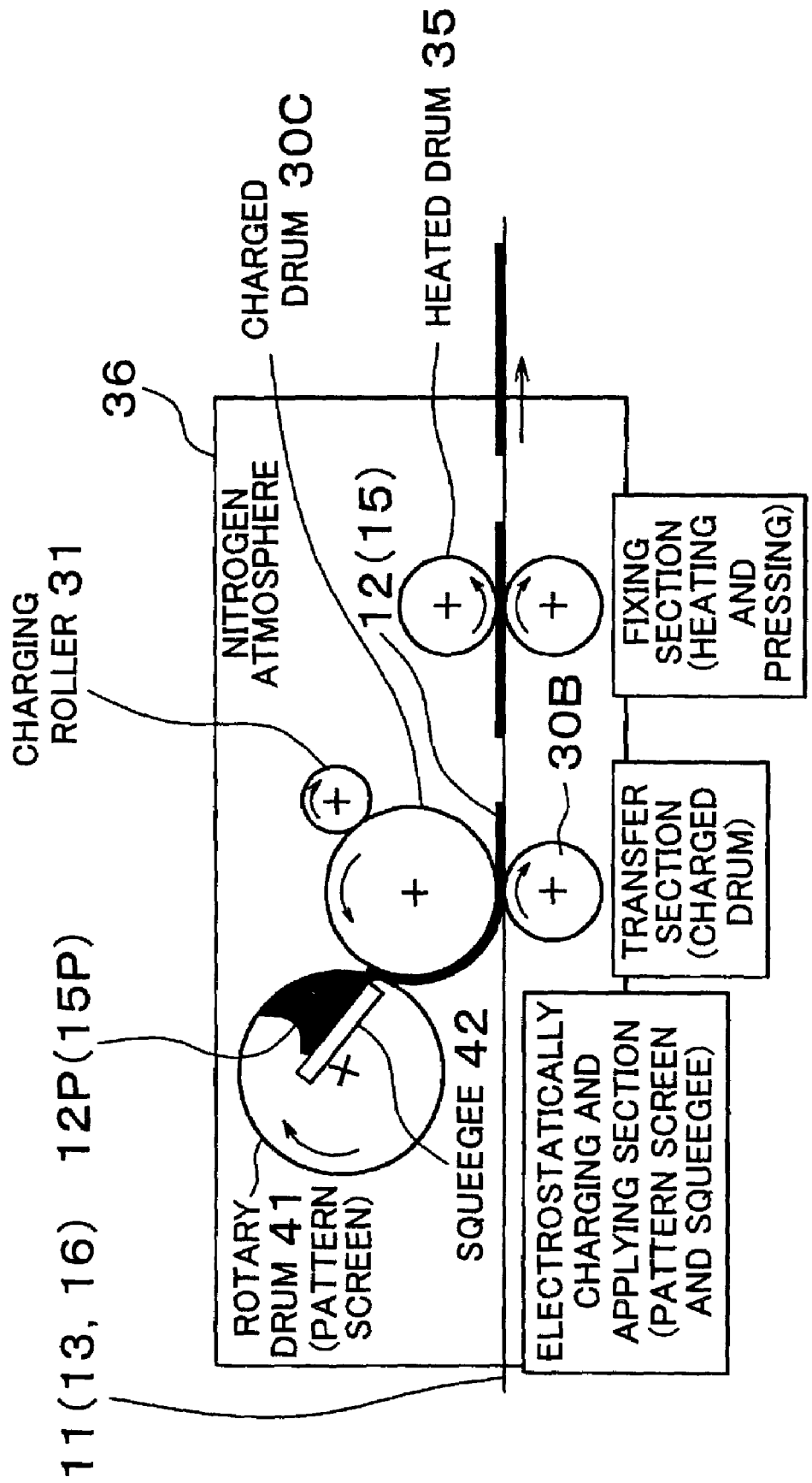
FIG. 19 is a side view of an apparatus for manufacturing a fuel cell electrode, which implements a method for manufacturing a fuel cell electrode according to a sixteenth embodiment of the invention.
Figure 20:
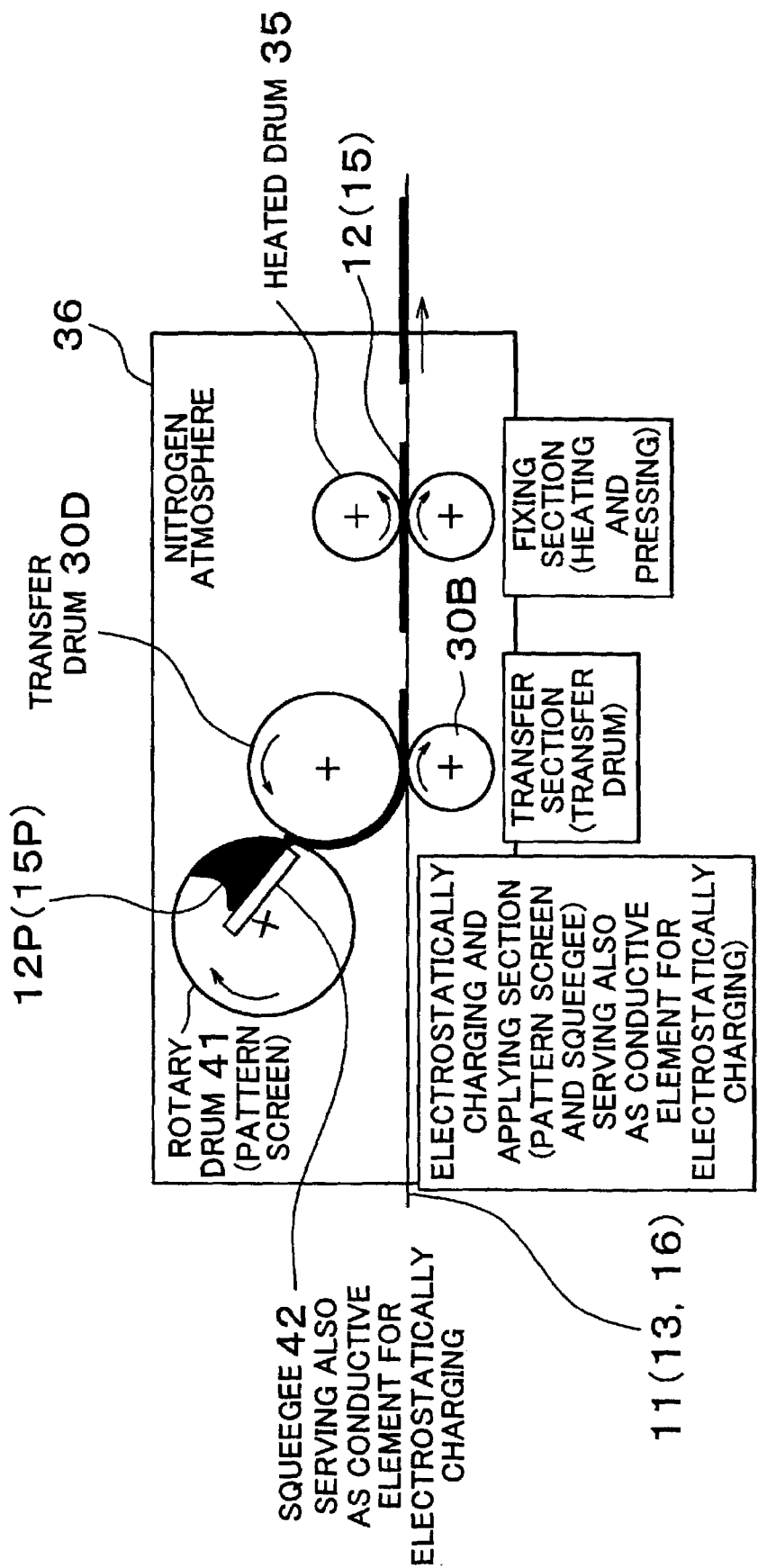
FIG. 20 is a side view of an apparatus for manufacturing a fuel cell electrode, which implements a method for manufacturing a fuel cell electrode according to a seventeenth embodiment of the invention.

An example of the manufacturing apparatus 1 for electrostatic application is an applying apparatus of electrostatic copying type as shown in FIGS. 3 to 17. An example of the manufacturing apparatus 1 for non-electrostatic application is an applying apparatus of screen and squeegee type as shown in FIGS. 18 to 20.

Figure 21:
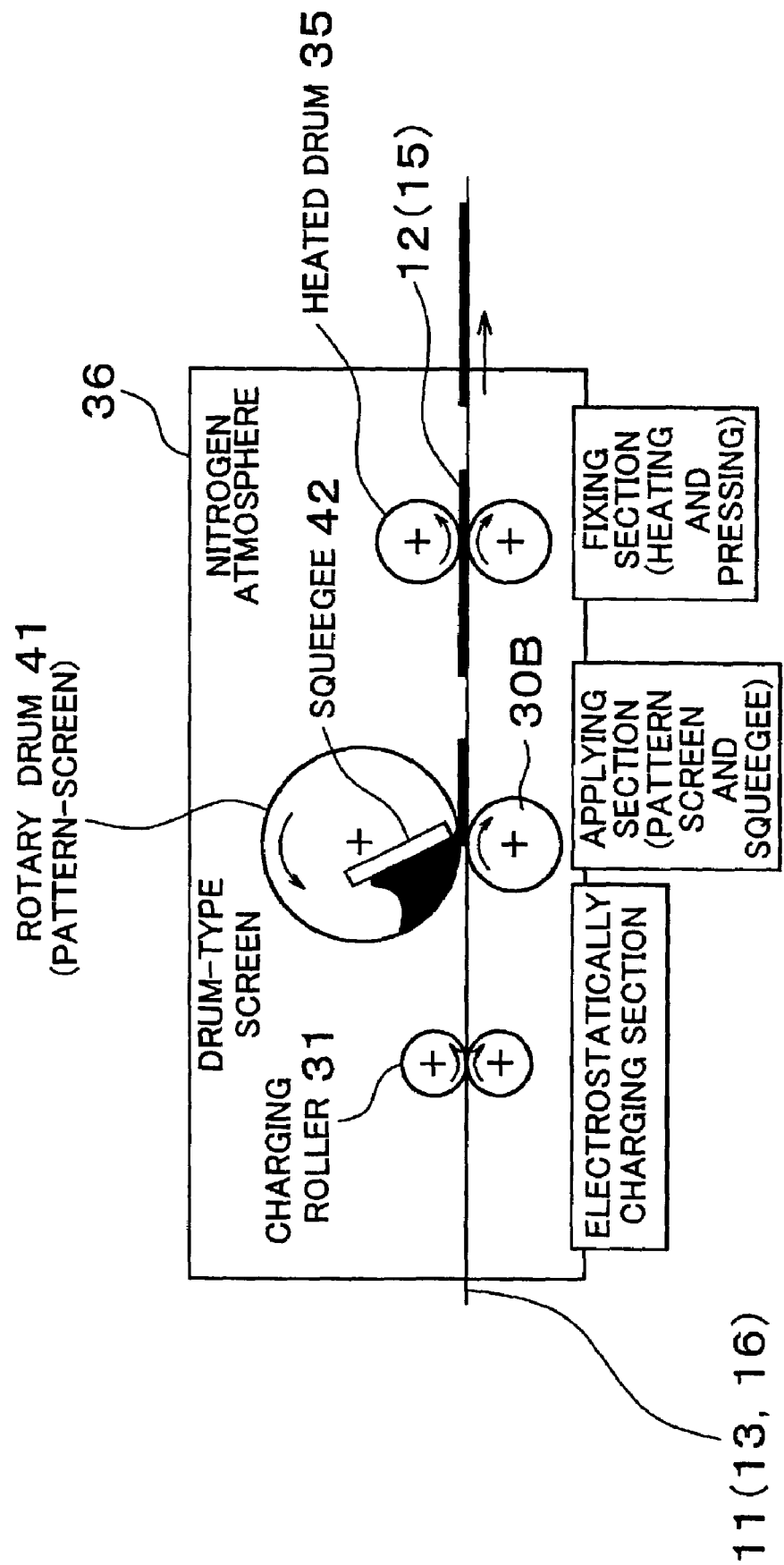
FIG. 21 is a side view of an apparatus for manufacturing a fuel cell electrode, which implements a method for manufacturing a fuel cell electrode according to an eighteenth embodiment of the invention.

As shown in FIG. 21, the manufacturing apparatus 1 may have electrode material supplying/applying devices 41, 42 for supplying a powdery electrode material 12P or 15P to the outer surface of a drum 41 and directly applying the electrode material 12P or 15P with a prescribed pattern to a target membrane (the electrolyte membrane 11 or the membrane formed from the diffusion layer 13 or 16), and a fixing device 35 for fixing the applied electrode material 12P or 15P to the target membrane.

Figure 3:
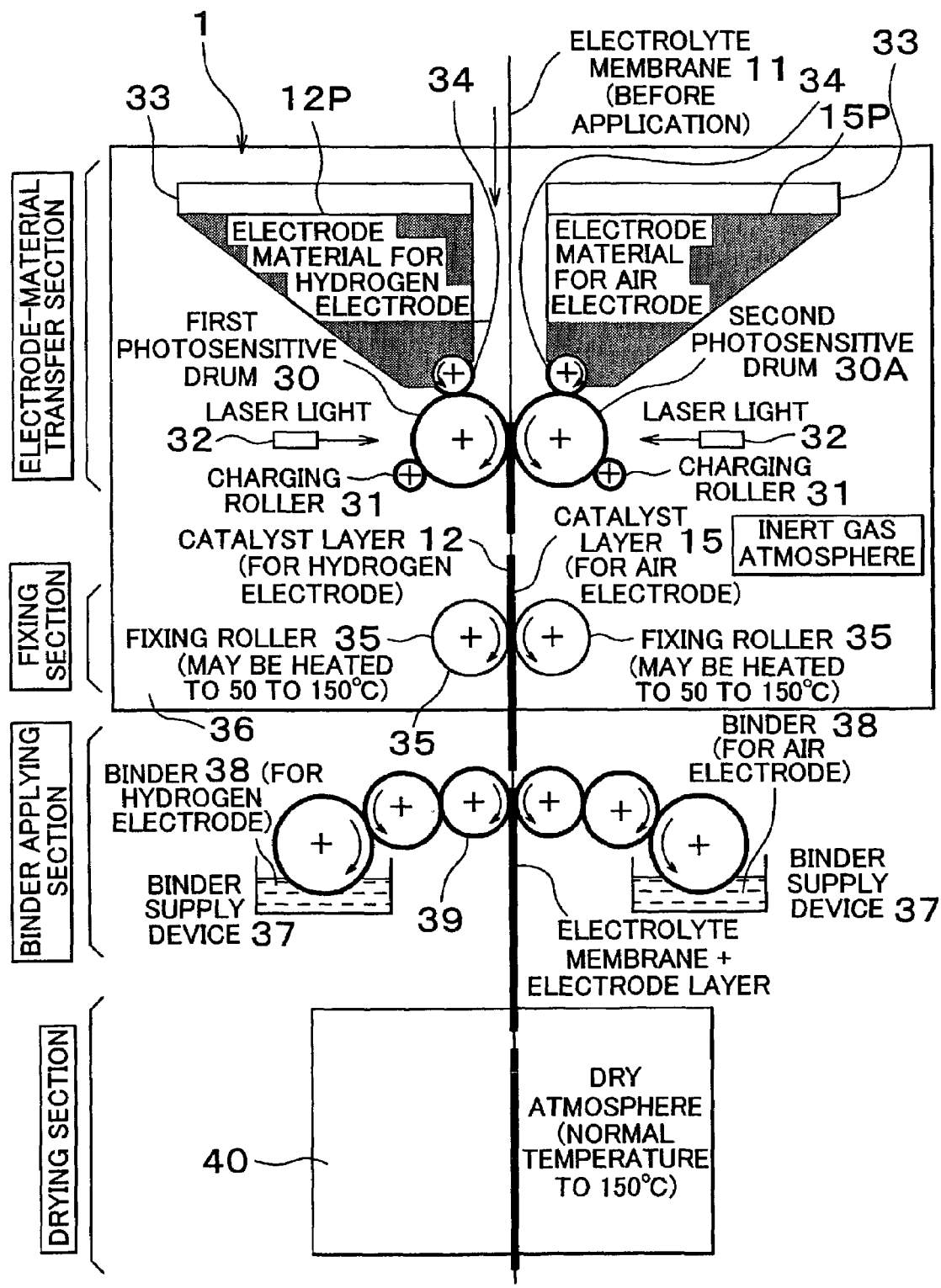
FIG. 3 is a side view of an apparatus for manufacturing a fuel cell electrode, which implements a method for manufacturing a fuel cell electrode according to a first embodiment of the invention.
Figure 18:
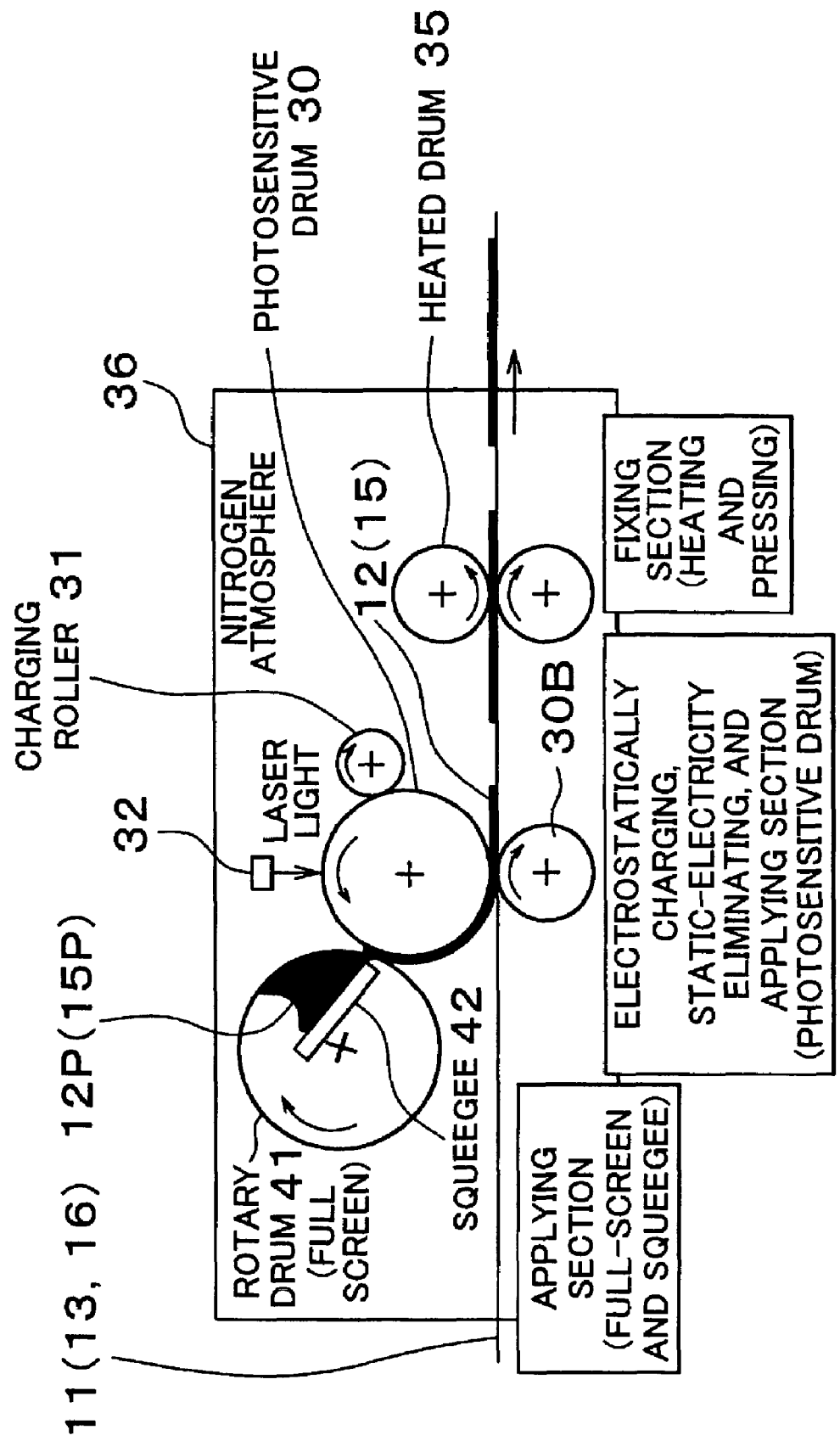
FIG. 18 is a side view of an apparatus for manufacturing a fuel cell electrode, which implements a method for manufacturing a fuel cell electrode according to a fifteenth embodiment of the invention.

Direct application herein does not mean application through the drum 30 as shown in FIGS. 3, 18, but means application from the drum 41 directly to the target membrane as shown in FIG. 21.

The manufacturing apparatus 1 will now be described in more detail with reference to FIGS. 3, 18 and 21.

First, an applying apparatus of electrostatic copying type will be described with reference to FIG. 3. As shown in FIG. 3, the manufacturing apparatus 1 includes a first photosensitive drum 30, a charging roller 31, a projector 32, a material supply roller 34, a second photosensitive drum 30A (which may alternatively be a normal drum or a roller such as roller 30B shown in FIG. 4 and the like), and a fixing roller 35. When electrode material is transferred to both surfaces of the electrolyte membrane 11 as shown in FIG. 3, the second photosensitive drum 30A can be regarded as a first drum or first roller of the invention with respect to the first photosensitive drum 30, and the first photosensitive drum 30 can be regarded as a first drum or first roller of the invention with respect to the second photosensitive drum 30A.

The charging roller 31 electrostatically charges the surface of the first photosensitive drum 30. The projector 32 projects light (e.g., laser light) onto the surface of the first photosensitive drum 30 other than a region of a prescribed pattern (i.e., a region where an electrode layer is to be formed) in order to eliminate static electricity from the surface of the first photosensitive drum 30 other than the region of the prescribed pattern (that is, static electricity is eliminated from the region subjected to laser light). The material supply roller 34 supplies electrode material 12P or 15P to the surface of the first photosensitive drum 30 from a container 33 containing the electrode material 12P or 15P. The electrolyte membrane 11 or the membrane of the diffusion layer 13 or 16 is fed between the first and second photosensitive drums 30, 30A. The second photosensitive drum 30A presses this membrane against the first photosensitive drum 30 (either the electrolyte membrane 11 or the membrane of the diffusion layer 13 or 16 may be used, but the following description is given with the electrolyte membrane 11). The fixing roller 35 is provided downstream of the first photosensitive drum 30 in the feeding direction of the electrolyte membrane 11.

As shown in FIG. 18, an applying apparatus of screen and squeegee type has a photosensitive drum 30, a screen drum 41 whose surface is at least partially formed from mesh (either the whole surface or a part of the surface may be formed from mesh), and a squeegee 42 mounted within the screen drum 41 in a stationary manner, for pressing an electrode material 12P or 15P contained in the screen drum 41. Holes of the mesh of the screen drum 41 are sized according to the particle size of the electrode material 12P or 15P. This allows the particles to pass through the mesh region of the screen drum 41 when they are pressed by the squeegee 42.

Figure 23:
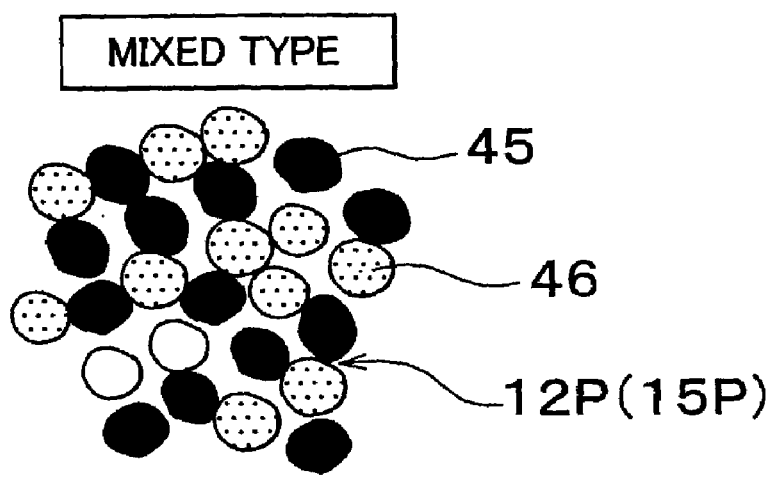
FIG. 23 is an enlarged view showing an example of electrode material that is applicable to any embodiment of the invention.
Figure 24:
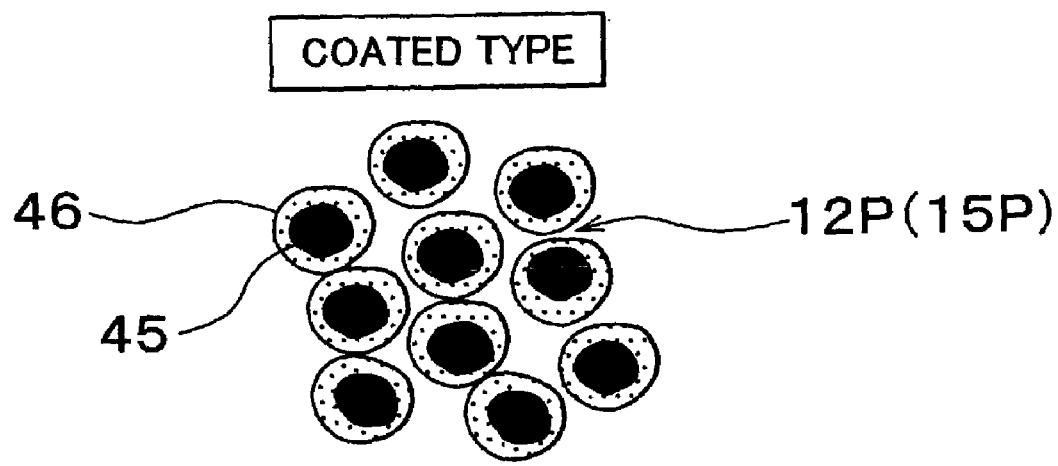
FIG. 24 is an enlarged view showing another example of electrode material that is applicable to any embodiment of the invention.

Either in the electrostatic copying type or the screen and squeegee type, each of the electrode materials 12P or 15P is a powdery material mainly containing a mixture of carbon powder 45 carrying a catalytic substance (e.g., Pt) thereon and electrolyte powder 46 (FIG. 23), or a powdery material mainly containing carbon powder 45 carrying a catalytic substance thereon and having its surface coated with an electrolyte 46 (which serves as a binder) (FIG. 24). In the case of the applying apparatus of screen and squeegee type, each of the electrode materials 12P or 15P may be a sol-like (jelly-like) material.

Either in the electrostatic copying type or the screen and squeegee type, the device for fixing the transferred electrode material 12P or 15P to the electrolyte membrane 11 or the membrane of the diffusion layer 13 or 16 is formed by a pair of heated drums 35 which are pressed against each other. The electrolyte membrane 11 or the membrane of the diffusion layer 13 or 16 is fed between the pair of drums 35 in order to fix the electrode material 12P and/or 15P to the electrolyte membrane 11 or the membrane of the diffusion layer 13 or 16.

Either in the electrostatic copying type or the screen and squeegee type, the fixing device 35 and devices disposed upstream of the fixing device 35 in the feeding direction of the membrane are provided in an inert gas atmosphere 36. In FIG. 3, an electrode material transfer section including the first photosensitive drum 30, the charging roller 31, the material supply roller 34 and the second photosensitive drum 30A or the roller 30B, and a fixing section including the fixing roller 35 are both provided in the inert gas atmosphere 36. In FIG. 18, an applying section including the drum 41 and the squeegee 42, an electrostatically-applying, static-electricity-eliminating, and applying section including the photosensitive drum 30 and the charging roller 31, and a fixing section including the fixing roller 35 are provided in the inert gas atmosphere 36. As shown in FIG. 21, in the screen and squeegee type, an applying section including the screen drum 41 and the squeegee 42, a transfer section formed by the drum 30, and a fixing section including the fixing roller 35 are provided in the inert gas atmosphere 36.

For example, the inert gas is nitrogen. Since an applying process is conducted in a heated atmosphere (e.g., the fixing roller 35 may be heated to 50 to 150° C.), these sections are provided in the inert gas atmosphere 36 in order to prevent ignition of the carbon powder.

Either in the electrostatic copying type or the screen and squeegee type, the electrode material 12P or 15P may be coated with a binder or mixed with binder particles. Alternatively, if the electrode material 12P or 15P is neither coated with a binder nor mixed with binder particles, the manufacturing apparatus 1 may further include a binder supply device 37 and a drying section 40 as shown in FIG. 3. In this case, the binder supply device 37 is provided downstream of the fixing roller 35 in the feeding direction of the electrolyte membrane 11, and the drying section 40 is provided downstream of the binder supply device 37. The binder supply device 37 forms a binder applying section. The internal temperature of the drying section 40 is adjusted in the range of normal temperature to 150° C. in order to dry the binder. The manufacturing apparatus 1 need not include the binder supply device 37 and the drying section 40 if the electrode material 12P or 15P is coated with a binder or mixed with binder particles.

The electrode material 12P or 15P may be applied to the drum 30 either electrostatically or non-electrostatically.

Hereinafter, a manufacturing method according to the invention will be described.

Examples of a method for manufacturing a fuel cell electrode by applying an electrode material through a drum include an application method of electrostatic copying type as shown in FIGS. 3 to 17 and an application method of screen and squeegee type as shown in FIGS. 18 to 21.

As shown in FIG. 3, the manufacturing method of electrostatic copying type includes the following steps in order to apply the electrode material 12P or 15P to the drum 30: the steps of charging the surface of the drum 30 with a prescribed pattern; and supplying the electrode material 12P or 15P to the drum 30 so as to cause the electrode material 12P or 15P to be electrostatically attached to the charged region of the drum 30.

More specifically, as shown in FIG. 3, the manufacturing method of electrostatic copying type includes the following steps in order to charge the surface of the first photosensitive drum 30 with a prescribed pattern: the steps of bringing the charging roller 31 into contact with the first photosensitive drum 30 in order to charge the whole surface of the first photosensitive drum 30; and projecting light from the projector 32 onto the surface of the first photosensitive drum 30 other than the region of the prescribed pattern in order to eliminate static electricity from the surface of the first photosensitive drum 30 other than the region of the prescribed pattern and to leave only the region of the prescribed pattern in the charged state. The manufacturing method of FIG. 3 further includes the steps of: electrostatically retaining the electrode material 12P or 15P on the first photosensitive drum 30 in the prescribed pattern; transferring the electrode material of the prescribed pattern from the first photosensitive drum 30 onto a target membrane (the electrolyte membrane 11 or the membrane of the diffusion layer 13 or 16) at least once (the electrode material may be first transferred from the first photosensitive drum 30 onto an intermediate medium membrane and then transferred from the intermediate medium membrane onto the target membrane); and fixing the transferred electrode material 12P or 15P of the prescribed pattern to the electrolyte membrane 11.

In the case of a copying machine, the powder is magnetically held on the drum. In the embodiments of the invention, however, the electrode material 12P or 15P is electrostatically held on the first photosensitive drum 30.

In the case of the screen and squeegee type, as shown in FIG. 18, a drum 30, a screen drum 41 whose surface is at least partially formed from mesh, and a squeegee 42 mounted within the screen drum 41 in a stationary manner are provided, and the manufacturing method of the fuel cell electrode includes the following step in order to apply the electrode material 12P or 15P to the drum 30: the step of pressing the electrode material 12P or 15P contained in the screen drum 41 by the squeegee 42 in order to apply the electrode material 12P or 15P to the drum 30 through the mesh region of the screen drum 41. Holes of the mesh of the screen drum 41 are sized according to the particle size of the electrode material 12P or 15P. This allows the particles to pass through the mesh region of the screen drum 41 when they are pressed by the squeegee 42. The electrode material may be applied to the drum 30 either electrostatically or non-electrostatically.

As described in terms of the apparatus, either in the method of electrostatic copying type or the method of screen and squeegee type, the target membrane is the electrolyte membrane 11 of the fuel cell or the membrane of the diffusion layer 13 or 16.

Moreover, either in the electrostatic copying type or the screen and squeegee type, each of the electrode materials 12P and 15P is a powdery material mainly containing a mixture of carbon powder 45 carrying a catalytic substance (e.g., Pt) thereon and electrolyte powder 46 (FIG. 23), or a powdery material mainly containing carbon powder 45 carrying a catalytic substance thereon and having its surface coated with an electrolyte 46 (FIG. 24).

In the electrostatic copying type, the particles of the electrode material 12P or 15P have a uniform particle size by classification. The electrode material 12P or 15P is vibrated or fluidized within the container 33 in order to prevent lumping of the powder. The electrode material 12P or 15P may be vibrated with ultrasonic waves or high-frequency current, or may be fluidized with a gas supplied from the bottom of the container 33.

In the screen and squeegee type, each of the electrode material 12P or 15P may be a sol-like (jelly-like) material.

Either in the electrostatic copying type or the screen and squeegee type, the electrolyte membrane 11 or the membrane of the diffusion layer 13 or 16 is fed between the pair of heated drums 35 which press against each other, whereby the transferred electrode material 12P and/or 15P are fixed to the membrane 11 or the membrane of the diffusion layer 13 or 16. The pressure is preferably 4 MPa or higher, which is about ten times as high as that for the copying machine, and the temperature is preferably in the range of 50 to 150° C. The temperature higher than 150° C. damages the electrolyte membrane 11, and the temperature less than 50° C. does not have a sufficient heating effect. A preferable temperature range is 80 to 120° C.

In the electrostatic copying type, the steps of electrostatically applying the electrode material 12P or 15P to the drum 30, transferring the applied electrode material 12P and/or 15P onto the electrolyte membrane 11 or the membrane of the diffusion layer 13 or 16, and fixing the transferred electrode material 12P or 15P are conducted in the inert gas atmosphere 36. In the screen and squeegee type, the steps of applying the electrode material 12P or 15P to the drum 30 or the electrolyte membrane 11 or the membrane of the diffusion layer 13 or 16 by using the screen drum 41 and the squeegee 42, and fixing the electrode material 12P or 15P are conducted in the inert gas atmosphere 36.

Either in the electrostatic copying type or the screen and squeegee type, the steps of applying a liquid binder 38 to the fixed electrode material and drying the applied liquid binder may be provided after the step of fixing the transferred electrode material 12P or 15P of the prescribed pattern to the electrolyte membrane 11 (or the membrane of the diffusion layer 13 or 16) with the fixing roller 35. The liquid binder 38 may be applied to the electrolyte membrane 11 (or the membrane of the diffusion layer 13 or 16) with a roller 39 or by a spraying method. These steps are provided in order to stabilize fixing of the electrode material 12P or 15P to the electrolyte membrane 11 (or the membrane of the diffusion layer 13 or 16).

The electrode material 12P or 15P may be coated with a binder or mixed with binder particles before the step of retaining the electrode material 12P or 15P on the first photosensitive drum 30 in a prescribed pattern. In this case, the electrode material 12P or 15P is sufficiently fixed to the electrolyte membrane 11 (or the membrane of the diffusion layer 13 or 16) in the fixing step. Therefore, the above steps of applying the liquid binder 38 and drying the applied liquid binder are not required.

Either in the electrostatic copying type or the screen and squeegee type, the electrode material 12P or 15P may be applied to the membrane 11 (or the membrane of the diffusion layer 13 or 16) a plurality of times in order to vary the electrode structure in the thickness direction.

Hereinafter, the effects of the structure that is common to the embodiments of the invention to be described later will be described.

In the method and apparatus for manufacturing a fuel cell electrode according to the invention, the electrode material is applied to the drum 30 or the membrane 11 (or the membrane of the diffusion layer 13 or 16) with a prescribed pattern. Therefore, varying the prescribed pattern enables fabrication of an electrode having an arbitrary shape or an electrode with its concentration or the like varied depending on the regions within the prescribed shape.

More specifically, in the case of the electrostatic copying type, the whole surface of the first photosensitive drum 30 is charged as shown in FIG. 3. The charged surface of the first photosensitive drum 30 is then subjected to laser light except the region to which the electrode material is to be applied. As a result, static electricity is eliminated from the exposed surface of the first photosensitive drum 30. The electrode material 12P or 15P is then attached only to the electrostatically charged region of the surface of the first photosensitive drum 30, and then transferred onto the electrolyte membrane 11 or the membrane of the diffusion layer 13 or 16. Therefore, controlling the exposure pattern and varying the laser light intensity depending on the regions of the exposure pattern would enable fabrication of an electrode having the catalyst layers 12, 15 with an arbitrary shape or an electrode having the catalyst layers 12, 15 with their concentration and the like being varied depending on the regions of a prescribed shape.

In other words, pattern exposure enables the cathode 14 (or catalyst layer 12) and the anode 17 (or catalyst layer 15) to be produced with an arbitrary shape, and also enables the electrode concentration (in the case of the copying machine, grayscale) to be varied within the shape. For example, the portion corresponding to the grooves (gas passage) of the separator can be formed with a high concentration of the electrode material (or catalyst), and the portion pressed by the ribs (the portion other than the gas passage) of the separator through the diffusion layer can be formed with a low concentration of the electrode material (or catalyst). As a result, the application amount of expensive catalytic noble metal can be reduced. Density of the fuel gas and oxidizing gas in the gases reduces as it flows downstream. According to the invention, the concentration of the electrode material can be varied according to the reduction of the density. This contributes to uniform power generation along the flow passage. Like the copying machine, the pattern and concentration can be easily varied within the cell plane.

In the case of the screen and squeegee type, the same effects as those described above can be obtained by selecting a pattern of the mesh region of the screen drum 41.

Moreover, the invention is based on a dry application method using the powdery electrode material 12P or 15P. Therefore, unlike a wet application method, cracks or the like are not generated in the electrode due to attacks of a solvent on the electrolyte membrane and swelling and shrinking of the electrolyte membrane caused by the solvent.

According to the invention, as shown in FIG. 3, the electrode material 12P or 15P is vibrated or fluidized within the container 33 (i.e., the powder is caused to drift by supplying air from the bottom of the container 33). Therefore, no lump of electrode material 12P or 15P is produced, enabling high-quality toner to be supplied. As a result, a high-quality, clear application pattern can be obtained on the electrolyte membrane 11 (or the membrane of the diffusion layer 13 or 16).

According to the invention, the step of fixing the electrode material 12P or 15P to the electrolyte membrane 11 (or the membrane of the diffusion layer 13 or 16) with the fixing roller 35 is conducted with a prescribed pressure and prescribed heat. Since the pressure is higher than (at least several times) that for the copying machine, reliable fixing is assured. Moreover, since the temperature is 150° C. or less (about 50° C. to 150° C.), the electrolyte membrane 11 is not damaged.

Moreover, the steps of retaining the electrode material 12P or 15P on the (first) photosensitive drum 30, transferring the electrode material 12P or 15P from the (first) photosensitive drum 30 onto the electrolyte membrane 11 (or the membrane of the diffusion layer 13 or 16), and fixing the transferred electrode material 12P or 15P to the electrolyte membrane 11 (or the membrane of the diffusion layer 13 or 16) are conducted in the inert gas atmosphere 36. This prevents combustion from occurring although the electrode material containing carbon powder is present in the heated atmosphere.

If the electrode material 12P or 15P in the container 33 is either coated with only the minimum amount of binder for preliminary fixing to the membrane or mixed with only the minimum amount of binder particles for preliminary fixing to the membrane, the steps of applying the liquid binder 38 to the fixed electrode material 12P or 15P and drying the applied liquid binder 38 are provided after the step of fixing the electrode material 12P or 15P to the membrane. This prevents the electrode from being deformed and separated even if the electrode is rubbed.

The electrode material 12P or 15P in the container 33 may be coated with a binder or mixed with binder particles in advance. In this case, the steps of applying a binder and drying the applied binder need not be provided after the fixing step. This simplifies the manufacturing process.

Either in the electrostatic copying type or the screen and squeegee type, applying the electrode material 12P and/or 15P to the electrolyte membrane 11 or the membrane of the diffusion layer 13 or 16 a plurality of time enables the electrode structure to be varied in the thickens direction and also enables the electrode structure to be varied three-dimensionally.

Hereinafter, the structure specific to each embodiment of the invention will be described.

First Embodiment (a powdery electrode material is first applied to the drum by a method of copying type and then transferred to the membrane)

According to the first embodiment of the invention, as shown in FIG. 3, the powdery electrode material 12P and 15P are applied to both surfaces of the electrolyte membrane 11 respectively to form the catalyst layers 12, 15.

The electrolyte membrane 11 is fed in the downward direction.

The electrode material 12P or 15P in the container 33 is neither coated with a binder nor mixed with binder particles. Therefore, the steps of applying a binder and drying the applied binder are provided after the fixing step.

In the first embodiment of the invention, the binder 38 is applied to the whole surface (not a part of the surface) by a wet application method. Moreover, the binder 38 does not contain any catalyst. Therefore, increase in costs does not occur.

When the membrane of the diffusion layer 13 is used instead of the electrolyte membrane 11, the electrode material 15P is not supplied to the membrane of the diffusion layer 13. When the membrane of the diffusion layer 16 is used instead of the electrolyte membrane 11, the electrode material 12P is not supplied to the membrane of the diffusion layer 16.

Second Embodiment (a powdery electrode material is first applied to the drum by a method of copying type and then transferred to the membrane)

Figure 4:
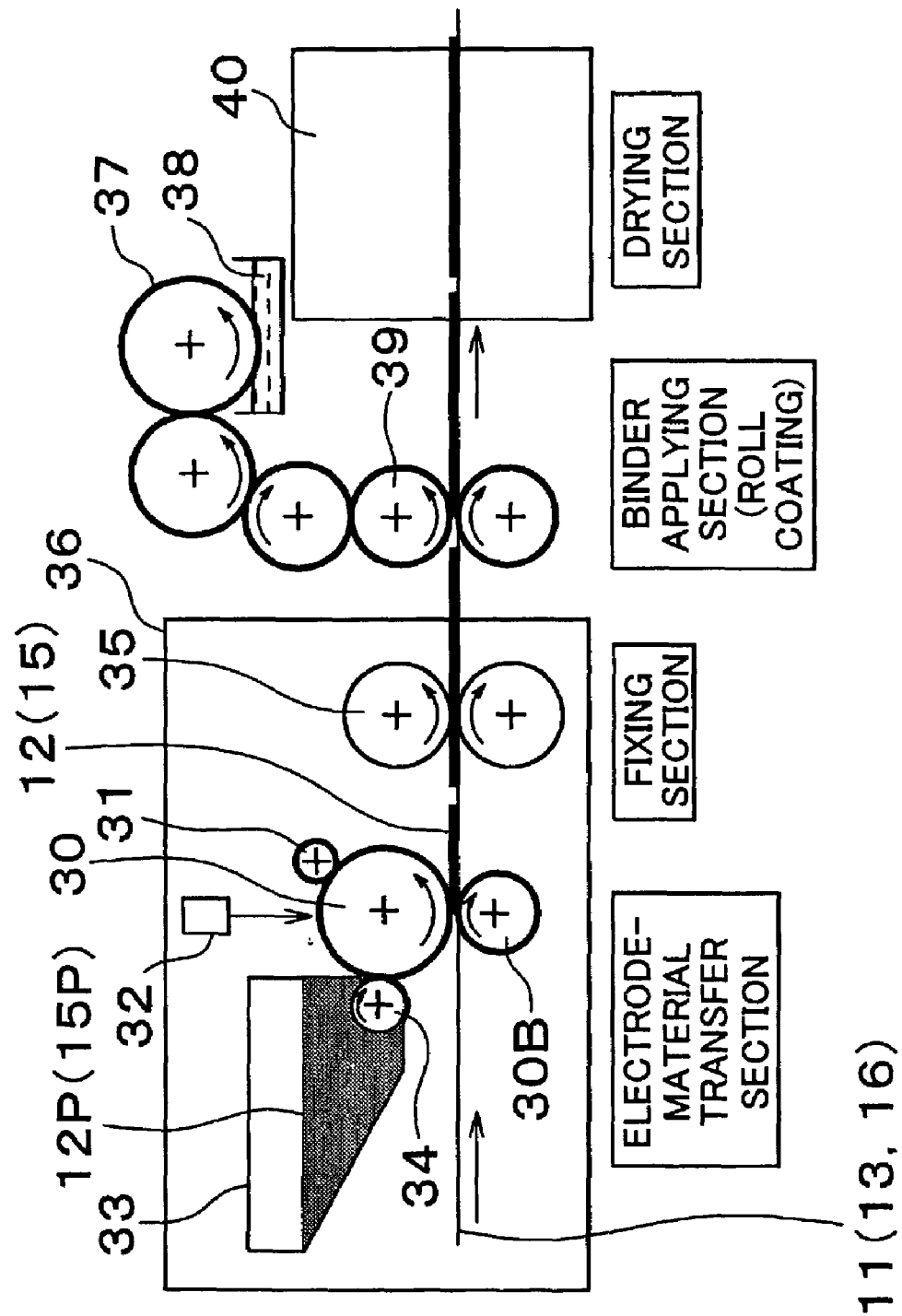
FIG. 4 is a side view of an apparatus for manufacturing a fuel cell electrode, which implements a method for manufacturing a fuel cell electrode according to a second embodiment of the invention.

According to the second embodiment of the invention, as shown in FIG. 4, the powdery electrode material 12P or 15P is applied to one surface of the electrolyte membrane 11 (or the membrane of the diffusion layer 13 or 16) to form the catalyst layer 12, 15.

The electrolyte membrane 11 (or the membrane of the diffusion layer 13 or 16) is fed in the horizontal direction.

The electrode material 12P or 15P in the container 33 is neither coated with a binder nor mixed with binder particles. Accordingly, the steps of applying a binder and drying the applied binder are provided after the fixing step.

In the second embodiment of the invention, the binder 38 is applied to the whole surface with a roller 39 by a wet application method. Moreover, the binder 38 does not contain any catalyst. Therefore, increase in costs does not occur.

Third Embodiment (a powdery electrode material is first applied to the drum by a method of copying type and then transferred to the membrane)

Figure 5:
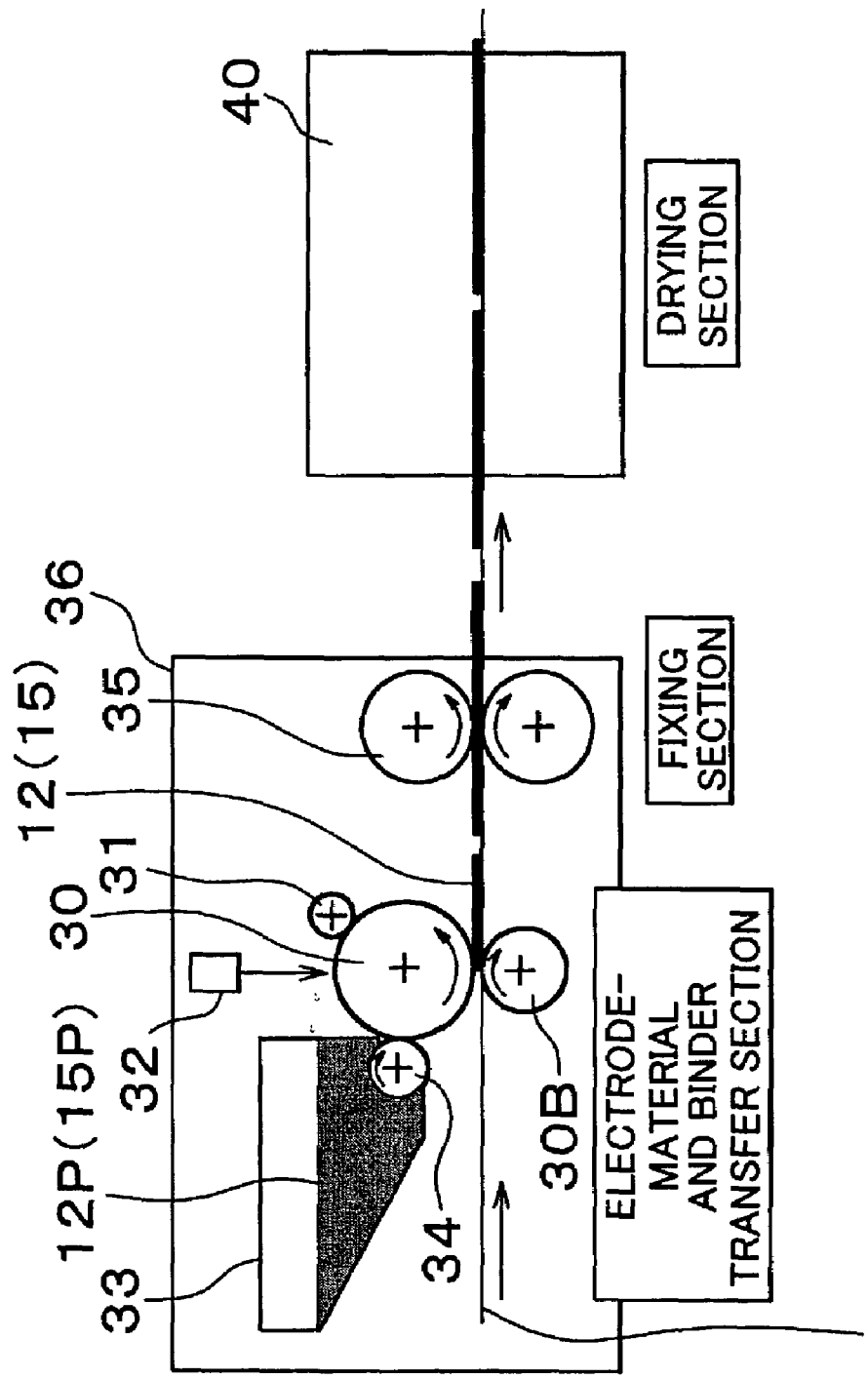
FIG. 5 is a side view of an apparatus for manufacturing a fuel cell electrode, which implements a method for manufacturing a fuel cell electrode according to a third embodiment of the invention.

According to the third embodiment of the invention, as shown in FIG. 5, the powdery electrode material 12P or 15P is applied to one surface of the electrolyte membrane 11 (or the membrane of the diffusion layer 13 or 16) to form the catalyst layer 12, 15.

The electrolyte membrane 11 (or the membrane of the diffusion layer 13 or 16) is fed in the horizontal direction.

The electrode material 12P or 15P in the container 33 is either coated with a binder or mixed with binder particles. Therefore, the step of applying a binder is not provided after the fixing step. In the illustrated example, the step of drying the binder is provided. However, this drying step may be eliminated.

Since the third embodiment of the invention does not include the step of applying the binder, the process is simplified.

Fourth Embodiment (a powdery electrode material is first applied to the drum by a method of copying type and then transferred to the membrane)

Figure 6:
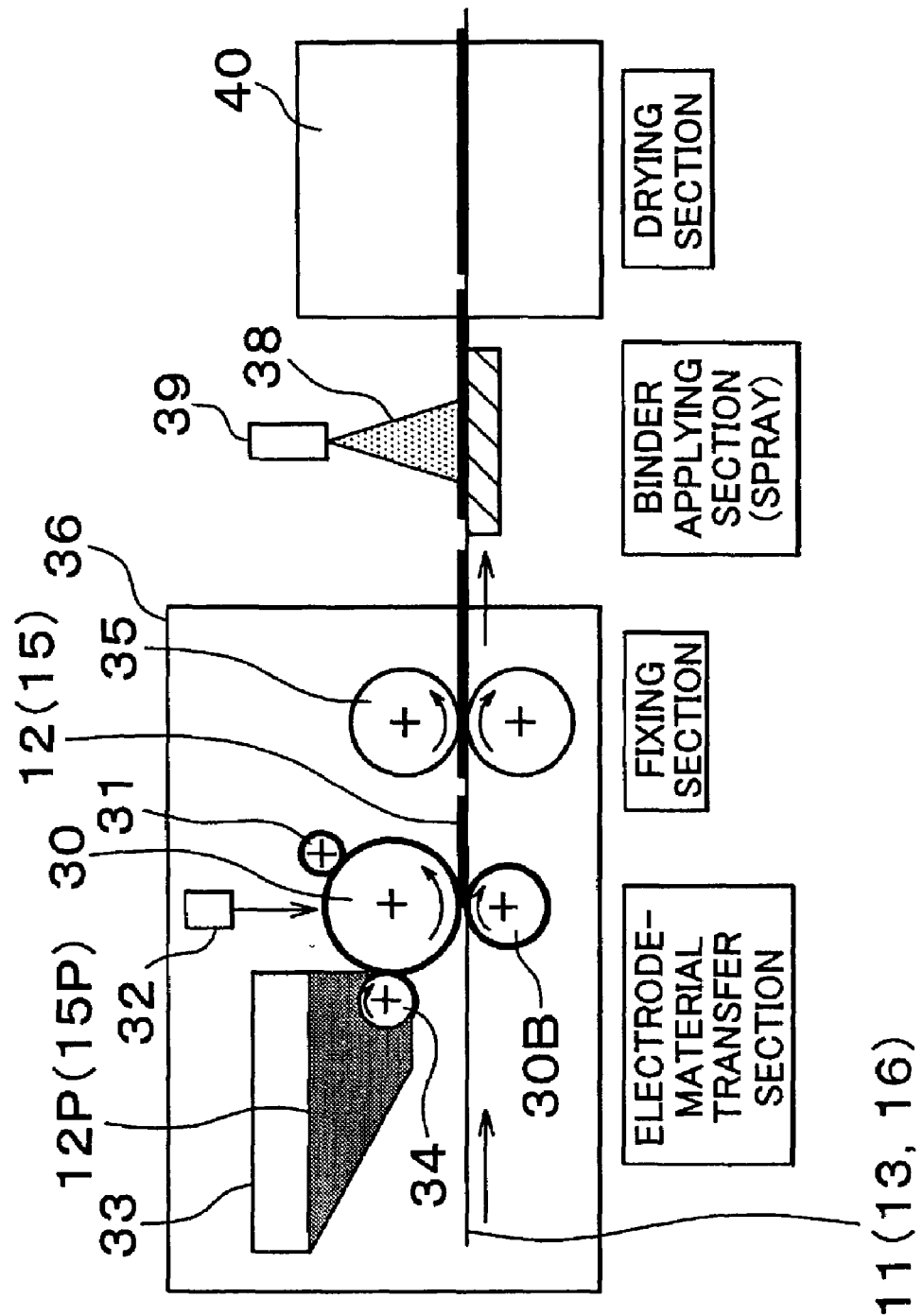
FIG. 6 is a side view of an apparatus for manufacturing a fuel cell electrode, which implements a method for manufacturing a fuel cell electrode according to a fourth embodiment of the invention.

According to the fourth embodiment of the invention, as shown in FIG. 6, the powdery electrode material 12P or 15P is applied to one surface of the electrolyte membrane 11 (or the membrane of the diffusion layer 13 or 16) to form the catalyst layer 12, 15.

The electrolyte membrane 11 (or the membrane of the diffusion layer 13 or 16) is fed in the horizontal direction.

The electrode material 12P or 15P in the container 33 is either coated with only the minimum amount of binder for preliminary fixing to the membrane or mixed with the minimum amount of binder particles for preliminary fixing to the membrane. Accordingly, the steps of applying a binder and drying the applied binder are provided after the fixing step.

In the fourth embodiment of the invention, the binder 38 is applied from a spray nozzle 39A to the whole surface by a spraying method. Moreover, the binder 38 does not contain any catalyst. Therefore, increase in costs does not occur.

Fifth Embodiment (a powdery electrode material is first applied to the drum by a method of copying type and then transferred to the membrane)

Figure 7:
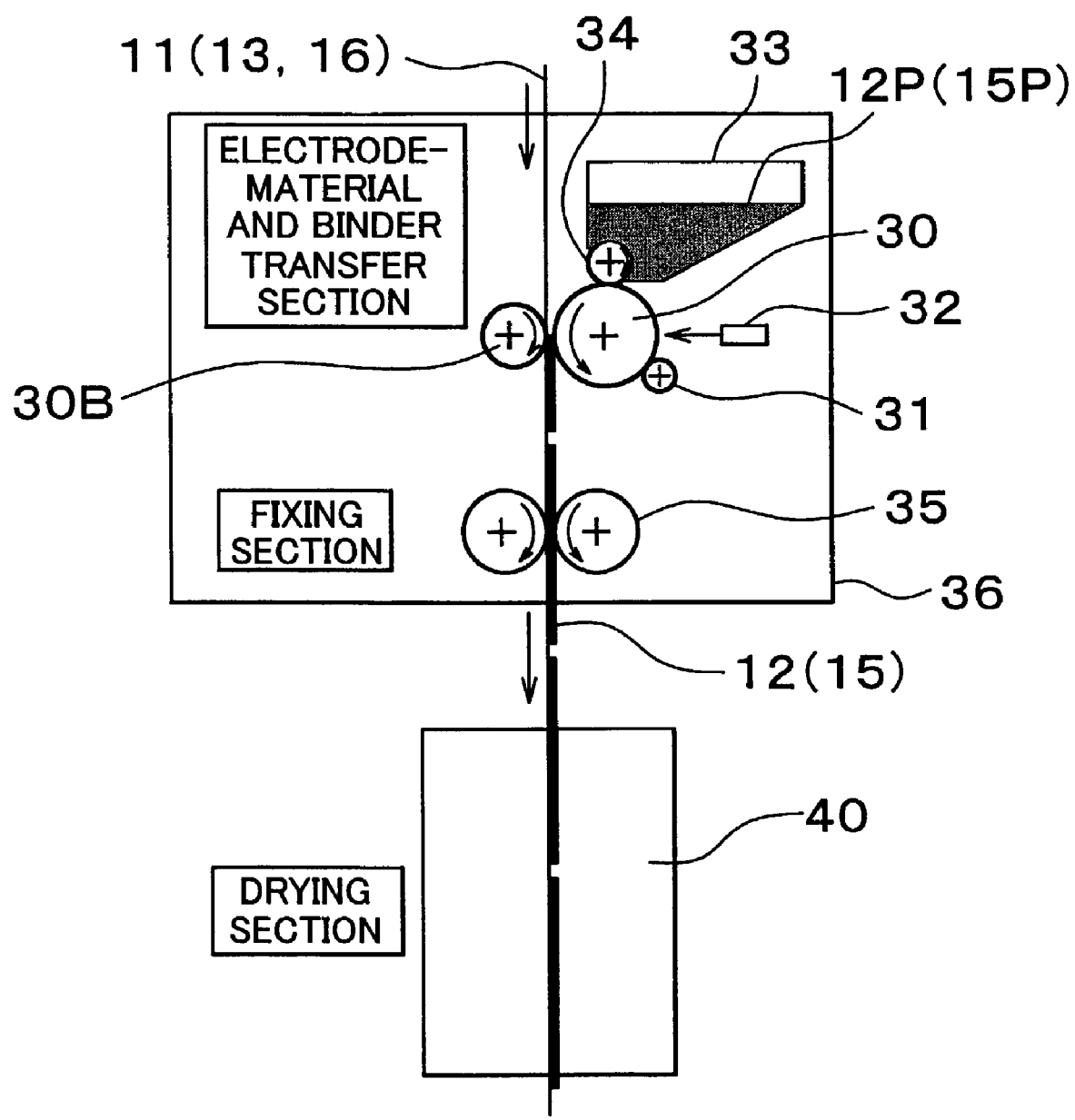
FIG. 7 is a side view of an apparatus for manufacturing a fuel cell electrode, which implements a method for manufacturing a fuel cell electrode according to a fifth embodiment of the invention.

According to the fifth embodiment of the invention, as shown in FIG. 7, the powdery electrode material 12P or 15P is applied to one surface of the electrolyte membrane 11 (or the membrane of the diffusion layer 13 or 16) to form the catalyst layer 12, 15.

The electrolyte membrane 11 (or the membrane of the diffusion layer 13 or 16) is fed in the downward direction.

The electrode material 12P or 15P in the container 33 is either coated with a binder or mixed with binder particles. Therefore, the step of applying a binder is not provided after the fixing step. In the illustrated example, the step of drying the binder is provided. However, this drying step may be eliminated.

Since the fifth embodiment of the invention does not include the step of applying the binder, the process is simplified.

Sixth Embodiment (a powdery electrode material is first applied to the drum by a method of copying type and then transferred to the membrane)

Figure 8:
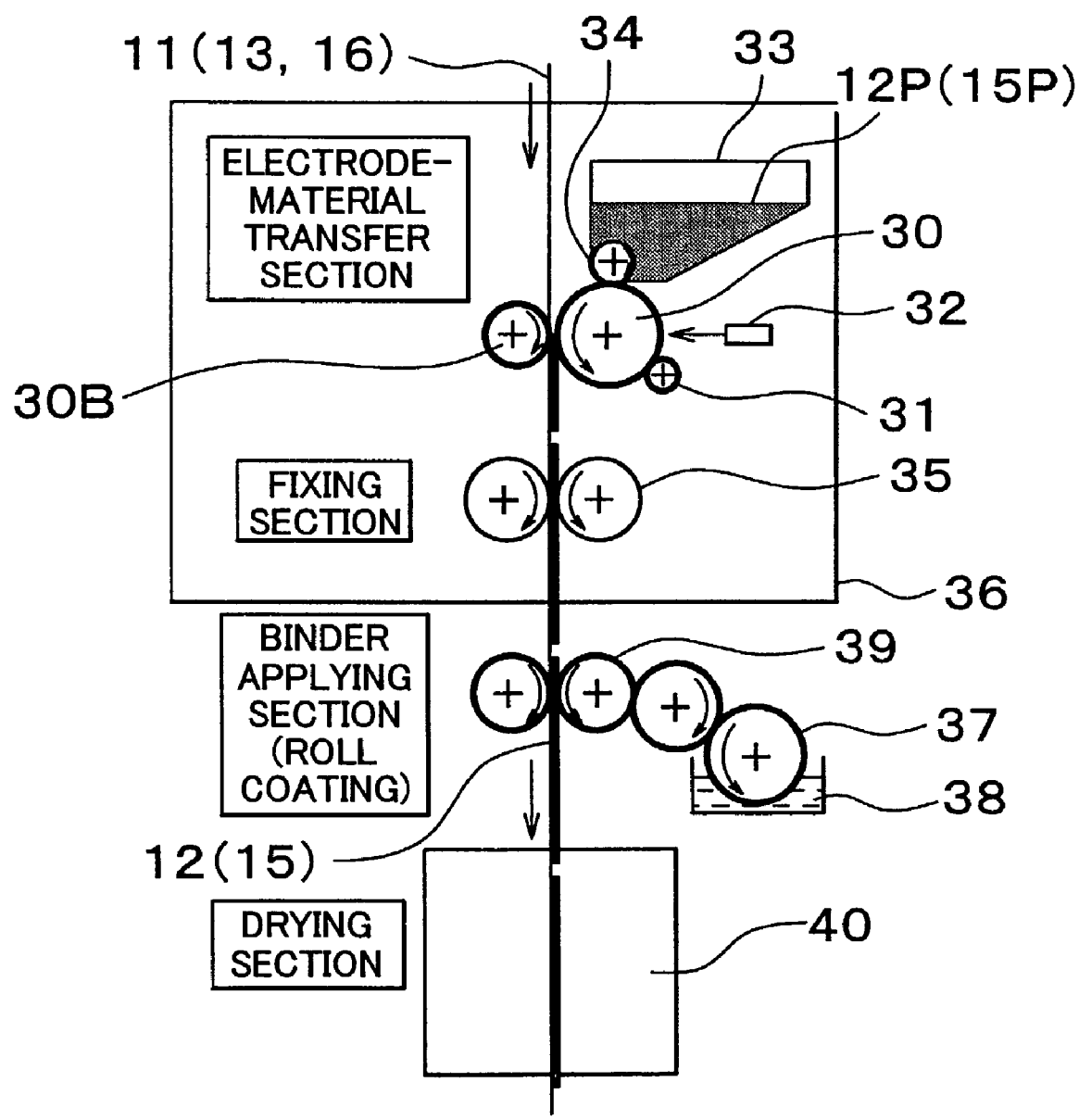
FIG. 8 is a side view of an apparatus for manufacturing a fuel cell electrode, which implements a method for manufacturing a fuel cell electrode according to a sixth embodiment of the invention.

According to the sixth embodiment of the invention, as shown in FIG. 8, the powdery electrode material 12P or 15P is applied to one surface of the electrolyte membrane 11 (or the membrane of the diffusion layer 13 or 16) to form the catalyst layer 12, 15.

The electrolyte membrane 11 (or the membrane of the diffusion layer 13 or 16) is fed in the downward direction.

The electrode material 12P or 15P in the container 33 is neither coated with a binder nor mixed with binder particles. Accordingly, the steps of applying a binder and drying the applied binder are provided after the fixing step.

In the sixth embodiment of the invention, the binder 38 is applied to the whole surface with a roller 39 by a wet application method. Moreover, the binder 38 does not contain any catalyst. Therefore, increase in costs does not occur.

Seventh Embodiment (a powdery electrode material is first applied to the drum by a method of copying type and then transferred to the membrane)

Figure 9:
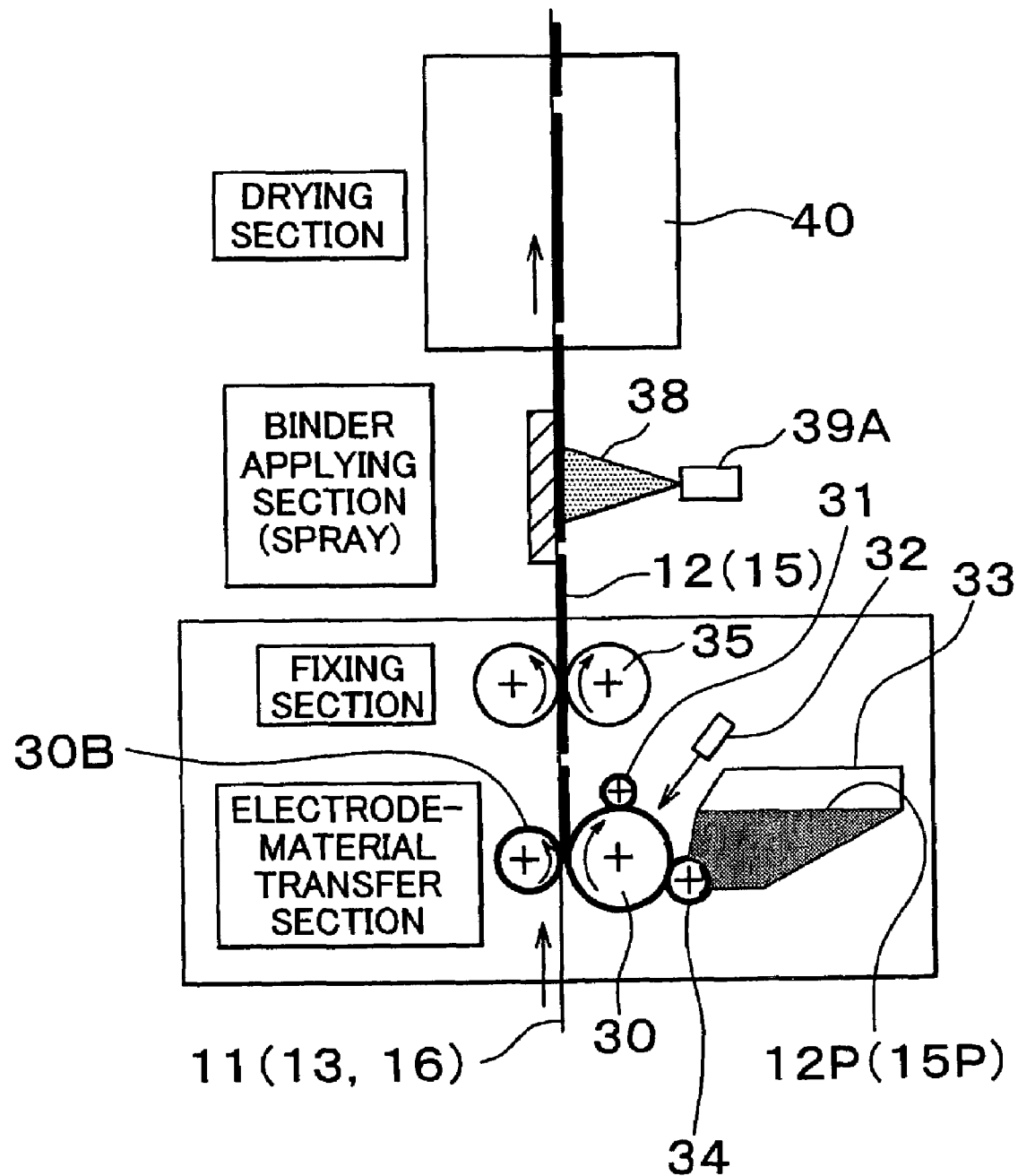
FIG. 9 is a side view of an apparatus for manufacturing a fuel cell electrode, which implements a method for manufacturing a fuel cell electrode according to a seventh embodiment of the invention.

According to the seventh embodiment of the invention, as shown in FIG. 9, the powdery electrode material 12P or 15P is applied to one surface of the electrolyte membrane 11 (or the membrane of the diffusion layer 13 or 16) to form the catalyst layer 12, 15. The electrolyte membrane 11 (or the membrane of the diffusion layer 13 or 16) is fed in the upward direction.

The electrode material 12P or 15P in the container 33 is either coated with only the minimum amount of binder for preliminary fixing to the membrane or mixed with the minimum amount of binder particles for preliminary fixing to the membrane. Accordingly, the steps of applying a binder and drying the applied binder are provided after the fixing step.

In the seventh embodiment of the invention, the binder 38 is applied from a spray nozzle 39A to the whole surface by a spraying method. Moreover, the binder 38 does not contain any catalyst. Therefore, increase in costs does not occur.

Eighth Embodiment (a powdery electrode material is first applied to the drum by a method of copying type and then transferred to the membrane)

Figure 10:
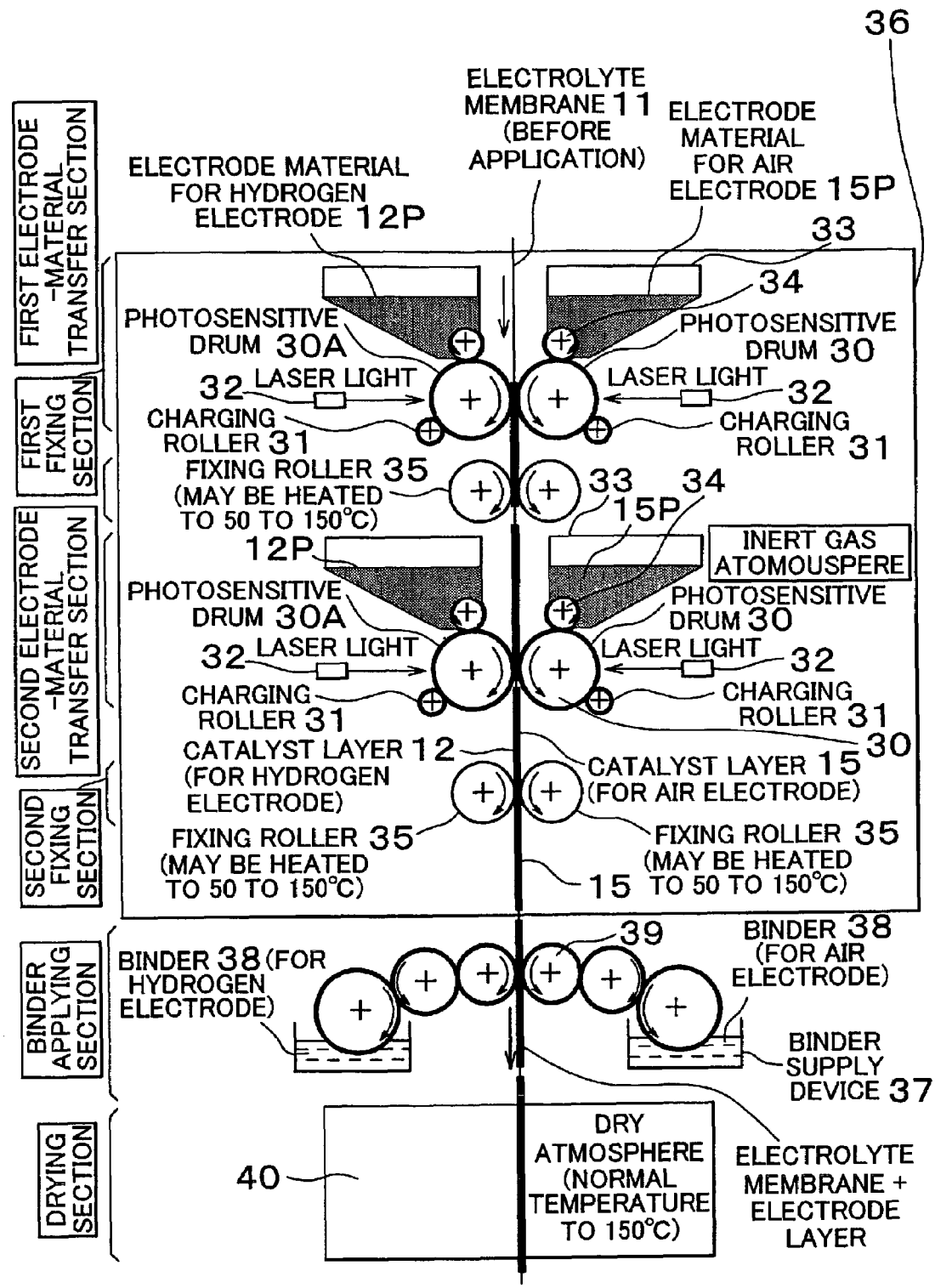
FIG. 10 is a side view of an apparatus for manufacturing a fuel cell electrode, which implements a method for manufacturing a fuel cell electrode according to an eighth embodiment of the invention.

According to the eighth embodiment of the invention, as shown in FIG. 10, the powdery electrode material 12P and 15P are applied to both surfaces of the electrolyte membrane 11 respectively to form the catalyst layers 12, 15.

The electrolyte membrane 11 is fed in the downward direction.

The steps of transferring the electrode material and fixing the transferred electrode material are conducted a plurality of times in the feeding direction of the membrane. In the illustrated example, these steps are conducted twice. More specifically, the following elements are sequentially arranged in the feeding direction of the membrane in order to conduct the above steps twice: a first electrode-material transfer section for conducting the first transfer step; a first fixing section for fixing the electrode material transferred onto the electrolyte membrane 11 by the first electrode-material transfer section; a second electrode-material transfer section for conducting the second transfer step; and a second fixing section for fixing the electrode material transferred onto the electrolyte membrane 11 by the second electrode-material transfer section.

Each electrode-material transfer section may have a different application pattern in terms of shape and concentration. This enables the structure of the application pattern (such as shape, concentration, thickness and composition in the thickness direction) to be varied three-dimensionally.

The electrode material 12P or 15P in the respective containers 33 are neither coated with a binder nor mixed with binder particles. Therefore, the steps of applying a binder and drying the applied binder are provided after the last fixing step.

For example, the binder may be applied by a roll coating method.

In the eighth embodiment of the invention, the application step is conducted a plurality of times, and at least one of the pattern, concentration, composition (e.g., ratio of carbon and catalyst, ratio of carbon, catalyst and binder) and thickness is varied in each application step. This enables the structure of the catalyst layer to be varied three-dimensionally including the thickness direction. However, the electrode structure may not be varied in the thickness direction. In other words, the membrane structure may be varied two-dimensionally.

FIGS. 11A to 11F show various examples of the structure of the catalyst layer 12, 15.

Figure 11A:
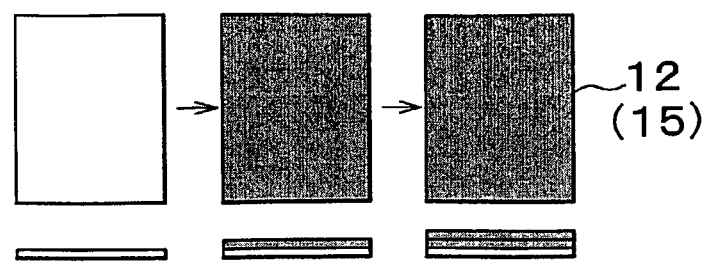
FIGS. 11A to 11F show various three-dimensional structures of an electrode produced by applying an electrode material a plurality of times.

In FIG. 11A, a plurality of catalyst layers are formed in the thickness direction so that the composition of each layer is varied in a stepwise manner. This results in a catalyst layer having its composition varied in the thickness direction.

Figure 11B:
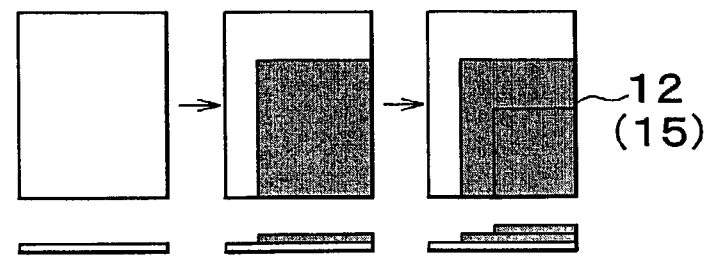

In FIG. 11B, a plurality of catalyst layers are formed in the thickness direction so that the shape of each layer is varied in a stepwise manner. This results in a catalyst layer having its total thickness varied within the plane of the catalyst layer.

Figure 11C:
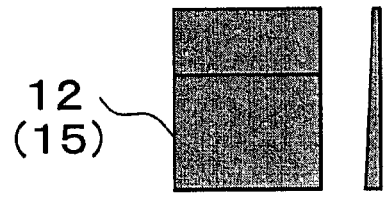

In FIG. 11C, the catalyst layer is divided into a plurality of segments in one direction within the cell plane (in the horizontal direction in the figure), and each segment is applied by a corresponding electrode material transfer section so that the application density and thickness of each segment are varied in a stepwise manner. This results in a catalyst layer having its structure (thickness, composition) gradually varied in the in-plane direction of the cell.

Figure 11D:
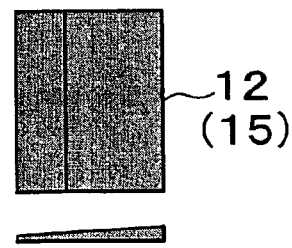

In FIG. 11D, the catalyst layer is divided into a plurality of segments in a direction within the cell plane which is different from the horizontal direction in the figure (in the perpendicular direction in the figure), and each segment is applied by a corresponding electrode material transfer section so that the application density and thickness of each segment are varied in a stepwise manner. This results in a catalyst layer having its structure gradually varied in the in-plane direction of the cell (in the vertical direction in the figure).

Figure 11E:
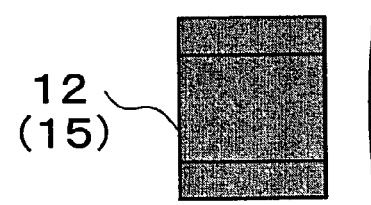

In FIG. 11E, the catalyst layer is divided into a plurality of segments in one direction within the cell plane, and each segment is applied by a corresponding electrode material transfer section so that the application density and thickness of each segment are gradually varied (increased) from one end of the catalyst layer to the center thereof and also gradually varied (decreased) from the center to the other end. This results in a catalyst layer having its structure varied between its end and center in the in-plane direction of the cell.

Figure 11F:
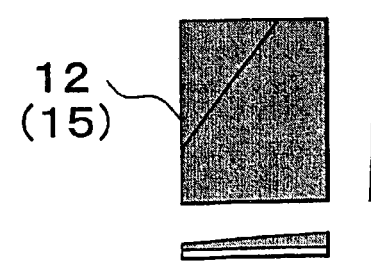

In FIG. 11F, the catalyst layer is divided into a plurality of segments in an oblique direction within the cell plane, and each segment is applied by a corresponding electrode material transfer section so that the application density and thickness of each segment are varied in a stepwise manner. This results in a catalyst layer having its structure gradually varied in the oblique direction within the cell plane.

Ninth Embodiment (a powdery electrode material is first applied to the drum by a method of copying type and then transferred to the membrane)

Figure 12:
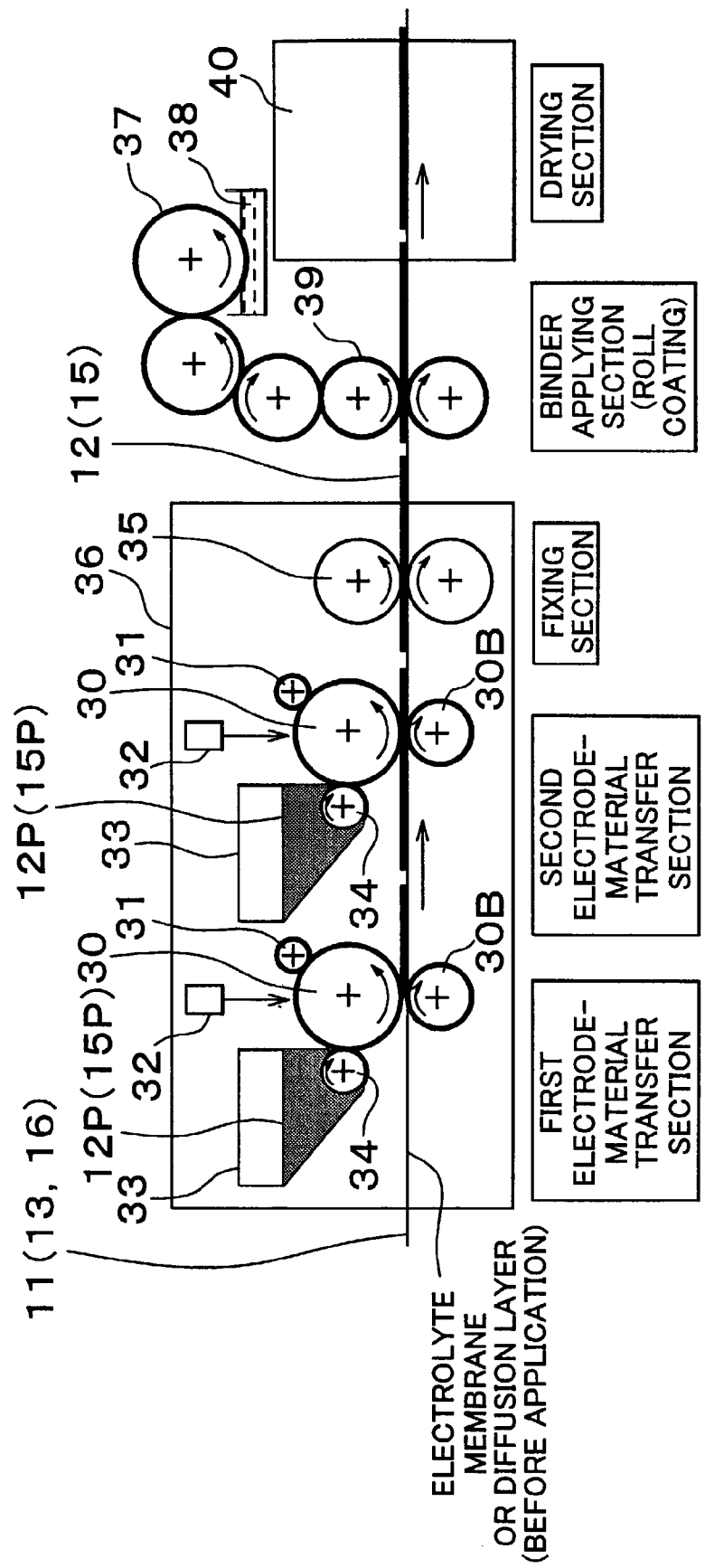
FIG. 12 is a side view of an apparatus for manufacturing a fuel cell electrode, which implements a method for manufacturing a fuel cell electrode according to a ninth embodiment of the invention.

According to the ninth embodiment of the invention, as shown in FIG. 12, the powdery electrolyte material powder 12P or 15P is applied to one surface of the electrolyte membrane 11 (or the membrane of the diffusion layer 13 or 16) to form the catalyst layer 12, 15. A plurality of electrode-material transfer sections are sequentially arranged in the feeding direction of the membrane so that the catalyst layer 12, 15 is formed with a plurality of layers.

The electrolyte membrane 11 (or the membrane of the diffusion layer 13 or 16) is fed in the horizontal direction.

The electrode material 12P or 15P in the container 33 is either coated with only the minimum amount of binder for preliminary fixing to the membrane or mixed with only the minimum amount of binder particles for preliminary fixing to the membrane. Therefore, the steps of applying a binder and drying the applied binder are provided after the fixing step.

In the ninth embodiment of the invention, the binder 38 is applied to the whole surface with a roller 39 by a wet application method. Moreover, the binder 38 does not contain any catalyst. Therefore, increase in costs does not occur.

Tenth Embodiment (a powdery electrode material is first applied to the drum by a method of copying type and then transferred to the membrane)

Figure 13:
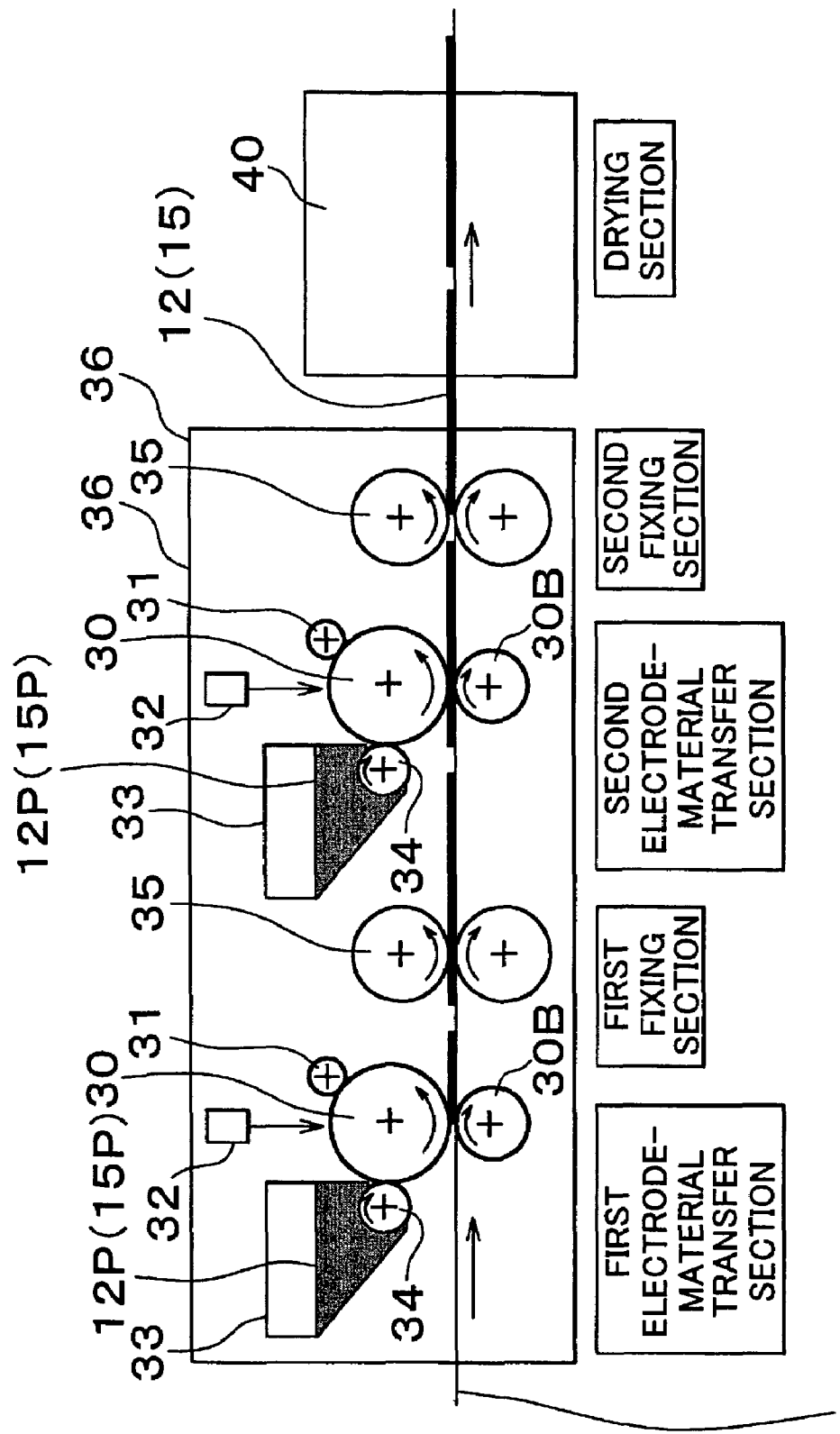
FIG. 13 is a side view of an apparatus for manufacturing a fuel cell electrode, which implements a method for manufacturing a fuel cell electrode according to a tenth embodiment of the invention.

According to the tenth embodiment of the invention, as shown in FIG. 13, the powdery electrode material 12P or 15P is applied to one surface of the electrolyte membrane 11 (or the membrane of the diffusion layer 13 or 16) to form the catalyst layer 12, 15. A plurality of electrode-material transfer sections are sequentially arranged in the feeding direction of the membrane so that the catalyst layer 12, 15 is formed with a plurality of layers.

The electrolyte membrane 11 (or the membrane of the diffusion layer 13 or 16) is fed in the horizontal direction.

The electrode material 12P or 15P in the container 33 is either coated with a binder or mixed with binder particles. Therefore, the step of applying a binder is not provided after the fixing step. In the illustrated example, the step of drying the binder is provided. However, this drying step may be eliminated.

Since the tenth embodiment of the invention does not include the step of applying the binder, the process is simplified.

Eleventh Embodiment (a powdery electrode material is first applied to the drum by a method of copying type and then transferred to the membrane)

Figure 14:
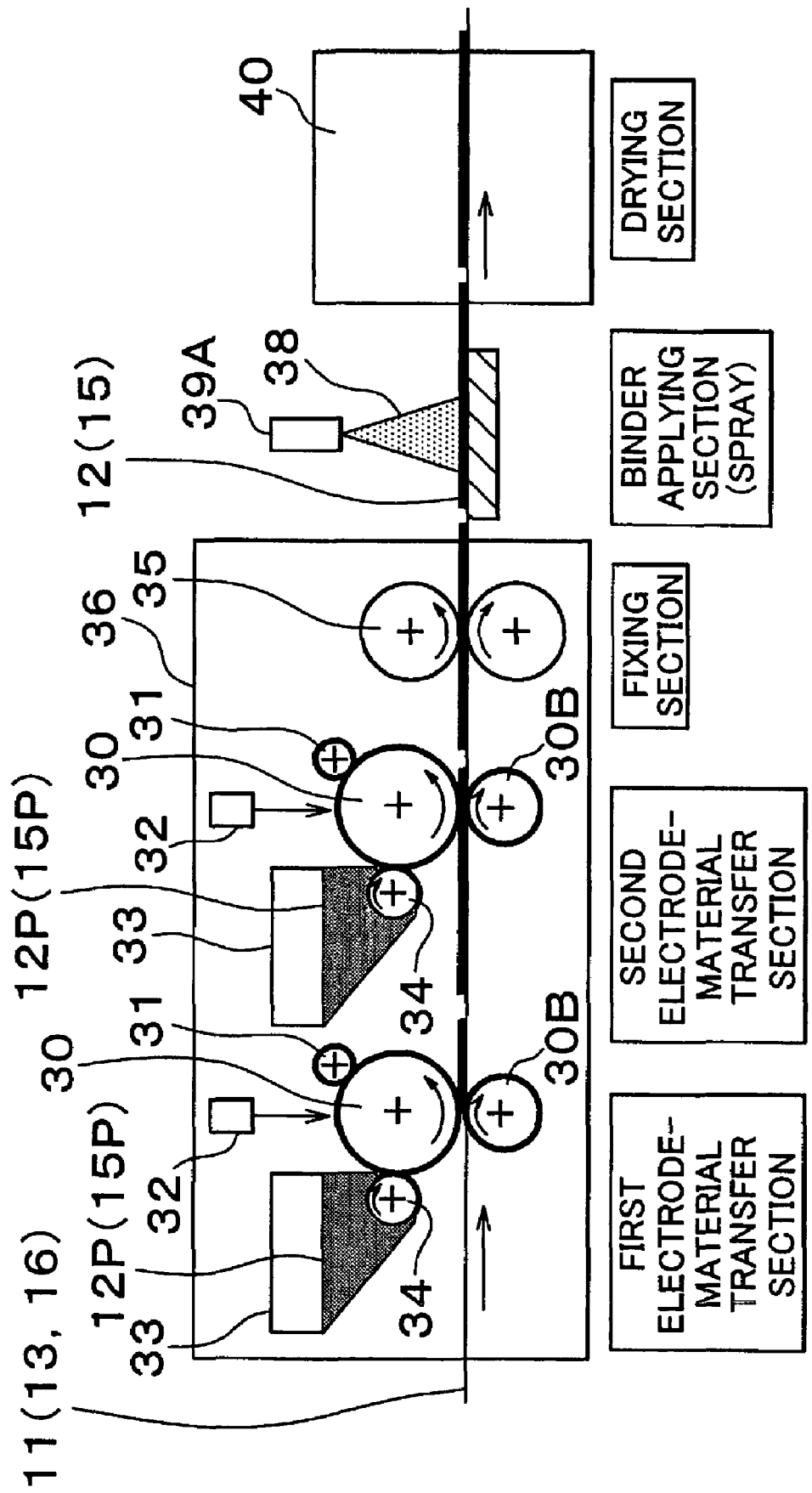
FIG. 14 is a side view of an apparatus for manufacturing a fuel cell electrode, which implements a method for manufacturing a fuel cell electrode according to an eleventh embodiment of the invention.

According to the eleventh embodiment of the invention, as shown in FIG. 14, the powdery electrode material 12P or 15P is applied to one surface of the electrolyte membrane 11 (or the membrane of the diffusion layer 13 or 16) to form the catalyst layer 12, 15. A plurality of electrode-material transfer sections are sequentially arranged in the feeding direction of the membrane so that the catalyst layer 12, 15 is formed with a plurality of layers.

The electrolyte membrane 11 (or the membrane of the diffusion layer 13 or 16) is fed in the horizontal direction.

The electrode material 12P or 15P in the container 33 is either coated with only the minimum amount of binder for preliminary fixing to the membrane or mixed with only the minimum amount of binder particles for preliminary fixing to the membrane. Accordingly, the steps of applying a binder and drying the applied binder are provided after the fixing step.

In the eleventh embodiment of the invention, the binder 38 is applied from a spray nozzle 39A to the whole surface by a spraying method. Moreover, the binder 38 does not contain any catalyst. Therefore, increase in costs does not occur.

Twelfth Embodiment (a powdery electrode material is first applied to the drum by a method of copying type and then transferred to the membrane)

Figure 15:
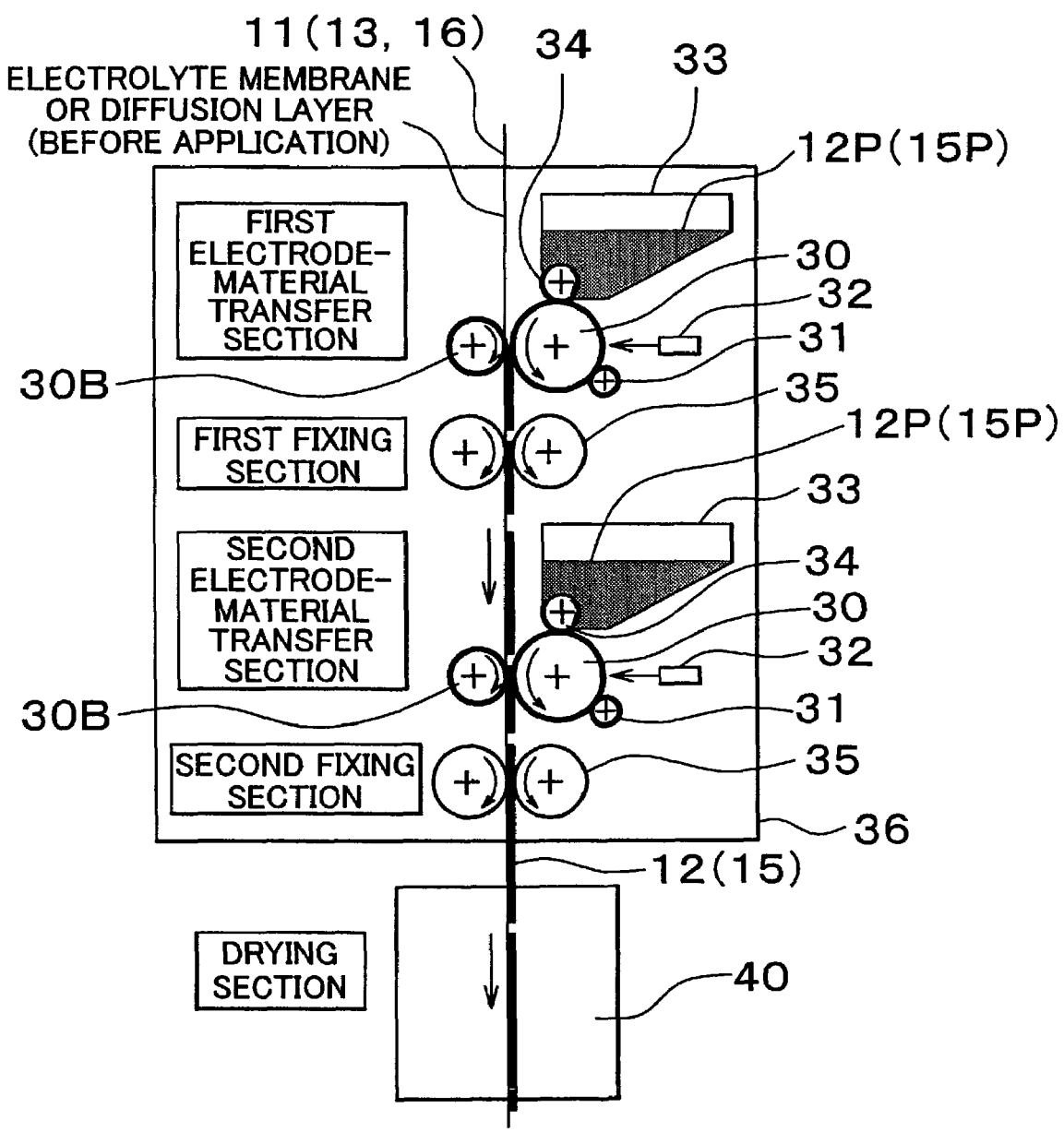
FIG. 15 is a side view of an apparatus for manufacturing a fuel cell electrode, which implements a method for manufacturing a fuel cell electrode according to a twelfth embodiment of the invention.

According to the twelfth embodiment of the invention, as shown in FIG. 15, the powdery electrode material 12P or 15P is applied to one surface of the electrolyte membrane 11 (or the membrane of the diffusion layer 13 or 16) to form the catalyst layer 12, 15. A plurality of electrode-material transfer sections are sequentially arranged in the feeding direction of the membrane so that the catalyst layer 12, 15 is formed with a plurality of layers.

The electrolyte membrane 11 (or the membrane of the diffusion layer 13 or 16) is fed in the downward direction.

The electrode material 12P or 15P in the container 33 is either coated with a binder or mixed with binder particles. Therefore, the step of applying a binder is not provided after the fixing step. In the illustrated example, the step of drying the binder is provided. However, this drying step may be eliminated.

Since the twelfth embodiment of the invention does not include the step of applying the binder, the process is simplified.

Thirteenth Embodiment (a powdery electrode material is first applied to the drum by a method of copying type and then transferred to the membrane)

Figure 16:
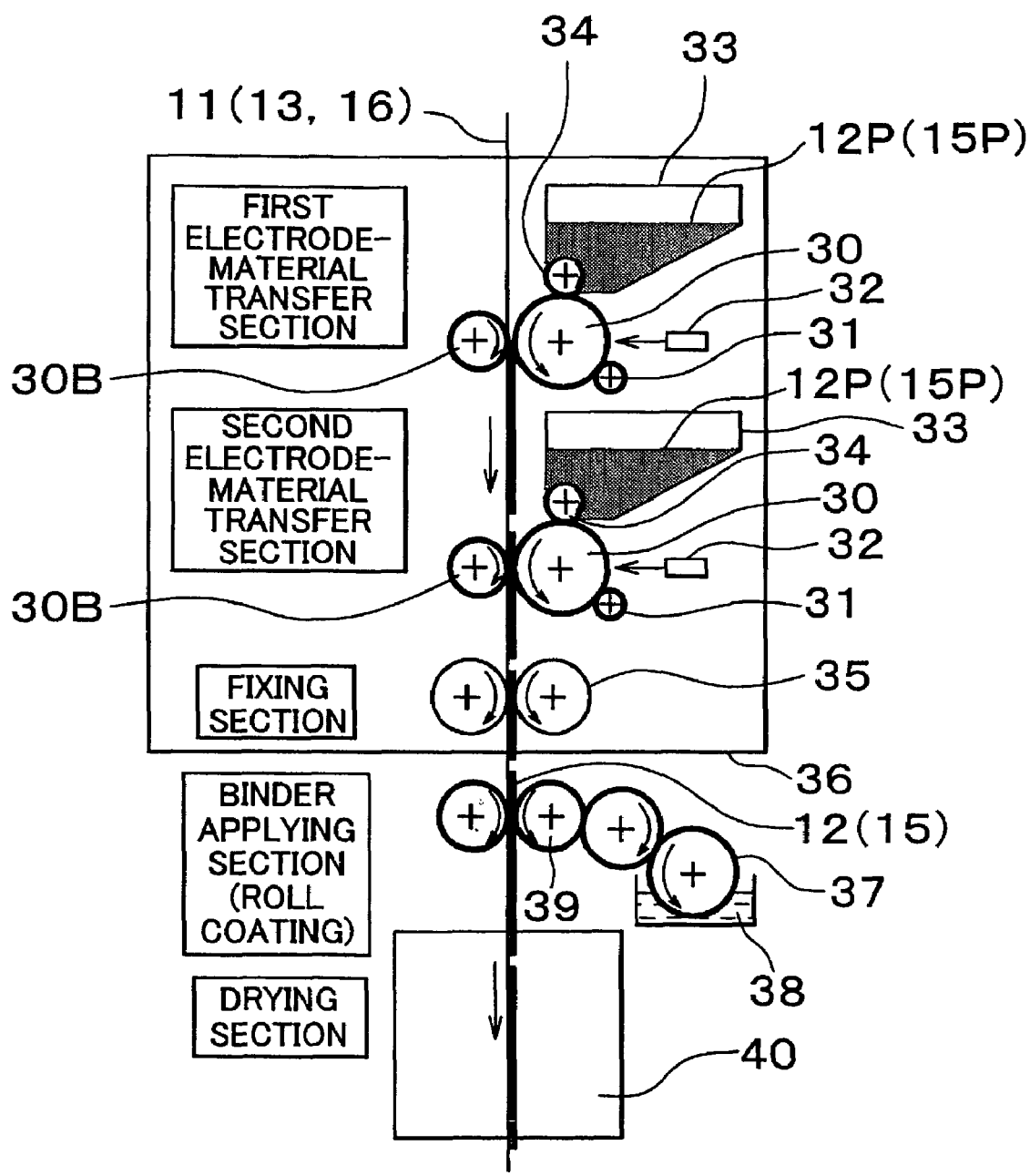
FIG. 16 is a side view of an apparatus for manufacturing a fuel cell electrode, which implements a method for manufacturing a fuel cell electrode according to a thirteenth embodiment of the invention.

According to the thirteenth embodiment of the invention, as shown in FIG. 16, the powdery electrode material 12P or 15P is applied to one surface of the electrolyte membrane 11 (or the membrane of the diffusion layer 13 or 16) to form the catalyst layer 12, 15. A plurality of electrode-material transfer sections are sequentially arranged in the feeding direction of the membrane so that the catalyst layer 12, 15 is formed with a plurality of layers.

The electrolyte membrane 11 (or the membrane of the diffusion layer 13 or 16) is fed in the downward direction.

The electrode material 12P or 15P in the container 33 is either coated with only the minimum amount of binder for preliminary fixing to the membrane or mixed with only the minimum amount of binder particles for preliminary fixing to the membrane. Therefore, the steps of applying a binder and drying the applied binder are provided after the fixing step.

In the thirteenth embodiment of the invention, the binder 38 is applied to the whole surface with a roller 39 by a wet application method. Moreover, the binder 38 does not contain any catalyst. Therefore, increase in costs does not occur.

Fourteenth Embodiment (a powdery electrode material is first applied to the drum by a method of copying type and then transferred to the membrane)

Figure 17:
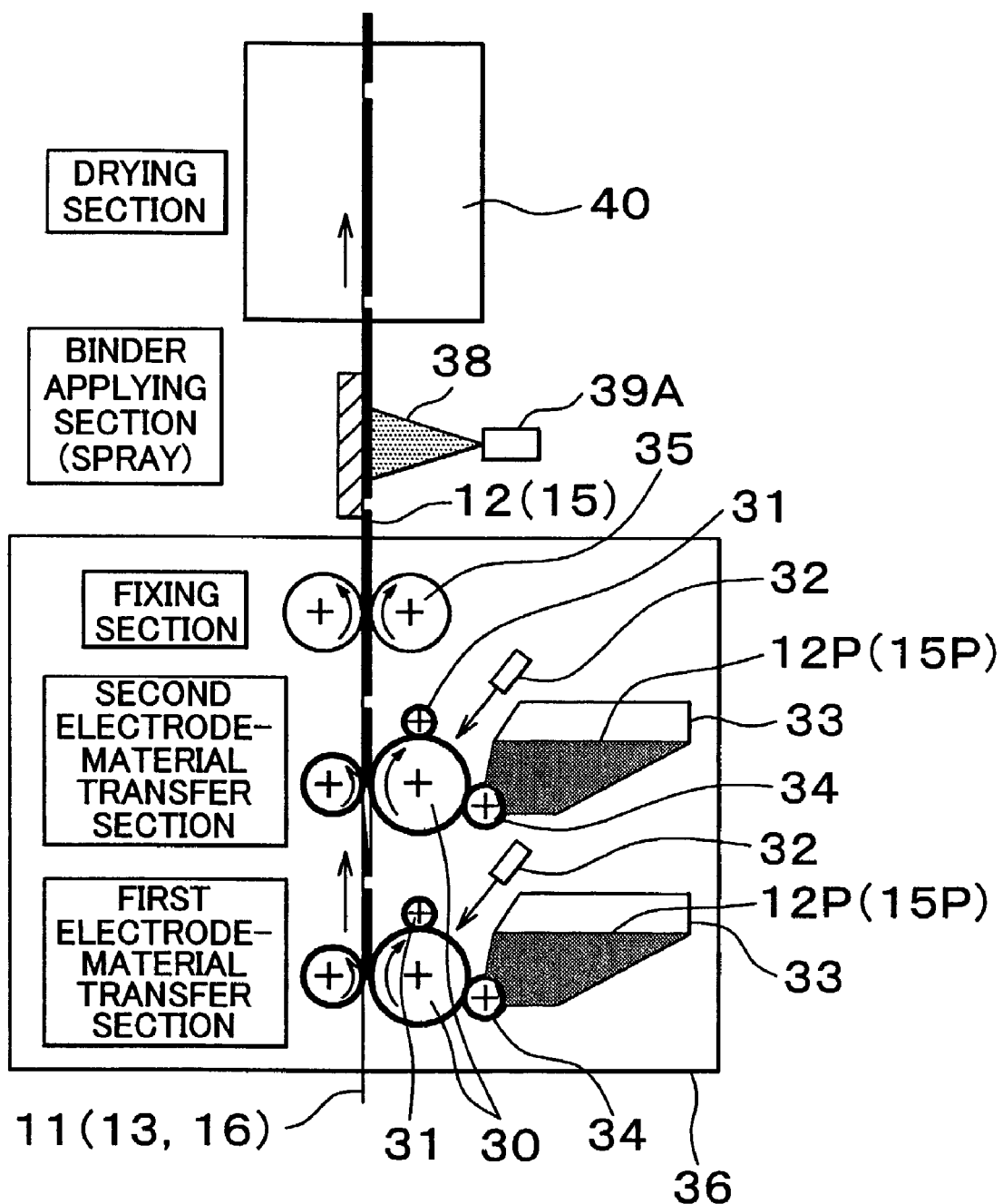
FIG. 17 is a side view of an apparatus for manufacturing a fuel cell electrode, which implements a method for manufacturing a fuel cell electrode according to a fourteenth embodiment of the invention.

According to the fourteenth embodiment of the invention, as shown in FIG. 17, the powdery electrode material 12P or 15P is applied to one surface of the electrolyte membrane 11 (or the membrane of the diffusion layer 13 or 16) to form the catalyst layer 12, 15. A plurality of electrode-material transfer sections are sequentially arranged in the feeding direction of the membrane so that the catalyst layer 12, 15 is formed with a plurality of layers.

The electrolyte membrane 11 (or the membrane of the diffusion layer 13 or 16) is fed in the upward direction.

The electrode material 12P or 15P in the container 33 is either coated with only the minimum amount of binder for preliminary fixing to the membrane or mixed with only the minimum amount of binder particles for preliminary fixing to the membrane. Accordingly, the steps of applying a binder and drying the applied binder are provided after the fixing step.

In the fourteenth embodiment of the invention, the binder 38 is applied from a spray nozzle 39A to the whole surface by a spraying method. Moreover, the binder 38 does not contain any catalyst. Therefore, increase in costs does not occur.

Fifteenth Embodiment (a powdery electrode material is first applied to the drum by a method of screen and squeegee type and then transferred to the membrane)

As shown in FIG. 18, the fifteenth embodiment of the invention uses a screen drum 41 and a squeegee 42. The whole surface of the screen drum 41 is formed from mesh, and holes of the mesh are sized according to the particle size of the powdery electrode material 12P or 15P. The squeegee 42 smoothes and presses the electrode material 12P or 15P so as to apply the electrode material 12P or 15P to the photosensitive drum 30. The electrode material 12P or 15P is applied to the photosensitive drum 30 through the mesh of the screen drum 41. The drum 30 may either be electrostatically charged or not. In the case where the drum 30 is electrostatically charged, a photosensitive drum is used as the drum 30. The whole surface of the photosensitive drum 30 is charged by the charging roller 31. Laser light or the like is then projected onto the surface of the photosensitive drum 30 other than the region of a prescribed pattern in order to eliminate static electricity from the surface of the photosensitive drum 30 other than the region of the prescribed pattern. As a result, the surface of the photosensitive drum 30 other than the exposed region is retained in the charged state. The electrode material 12P or 15P is applied with a prescribed pattern to the charged region of the photosensitive drum 30. The electrode material 12P or 15P thus applied to the photosensitive drum 30 is transferred from the photosensitive drum 30 onto the electrolyte membrane 11 (or the membrane of the diffusion layer 13 or 16), whereby the catalyst layer 12, 15 is formed. The electrolyte membrane 11 (or the membrane of the diffusion layer 13 or 16) is then fed between a pair of heated drums 35 in order to fix the transferred electrode material 12P or 15P to the electrolyte membrane 11 (or the membrane of the diffusion layer 13 or 16). The fixing section and the applying section disposed upstream of the fixing section are retained in an inert gas atmosphere 36.

In the fifteenth embodiment of the invention, the electrode material is applied to the drum by the method of screen and squeegee type. In other words, particles of the electrode material are applied to the photosensitive drum 30 through the mesh. Therefore, particles having uniform size are applied to the photosensitive drum 30, and lumps of the carbon powder are not applied to the photosensitive drum 30. Moreover, since the screen drum 41 is rotating during the process, the electrode material 12P or 15P is fluidized within the screen drum 41 in an excellent manner.

Sixteenth Embodiment (a powdery electrode material is first applied to the drum by a method of screen and squeegee type and then transferred to the membrane)

As shown in FIG. 19, the sixteenth embodiment of the invention uses a screen drum 41 and a squeegee 42. The screen drum 41 is partially formed from mesh. More specifically, the screen drum 41 has a mesh region having a pattern corresponding to the shape of an electrode to be manufactured. Holes of the mesh are sized according to the particle size of the powdery electrode material 12P or 15P. The squeegee 42 smoothes and presses the electrode material 12P or 15P so as to apply the electrode material 12P or 15P to the drum 30C. The electrode material 12P or 15P in the screen drum 41 is thus applied to the drum 30C through the mesh of the screen drum 41, that is, the mesh region having a pattern corresponding to the shape of the electrode. The drum 30C may either be electrostatically charged or not. In the case where the drum 30C is electrostatically charged, a charged drum is used as the drum 30C. The whole surface of the drum 30C is charged by the charging roller 31. The electrode material is then applied with a prescribed pattern to the charged drum 30C through the mesh of the screen drum 41, that is, the mesh region having a pattern corresponding to the shape of the electrode. The electrode material 12P or 15P thus applied to the charged drum 30C is transferred from the charged drum 30C onto the electrolyte membrane 11 (or the membrane of the diffusion layer 13 or 16), whereby the catalyst layer 12, 15 is formed. The electrolyte membrane 11 (or the membrane of the diffusion layer 13 or 16) is then fed between a pair of heated drums 35 in order to fix the transferred electrode material 12P or 15P to the electrolyte membrane 11 (or the membrane of the diffusion layer 13 or 16). The fixing section and the applying section disposed upstream of the fixing section are retained in an inert gas atmosphere 36.

In the sixteenth embodiment of the invention, the electrode material is applied to the drum by the method of screen and squeegee type. In other words, particles of the electrode material are applied to the drum 30C through the mesh. Therefore, particles having uniform size are applied to the drum 30C, and lumps of the carbon powder are not applied to the drum 30C. Moreover, since the screen drum 41 is rotating during the process, the electrode material 12P or 15P is fluidized within the screen drum 41 in an excellent manner.

Seventeenth Embodiment (a powdery electrode material is first applied to the drum by a method of screen and squeegee type and then transferred to the membrane)

As shown in FIG. 20, the seventeenth embodiment of the invention uses a screen drum 41 and a squeegee 42. The screen drum 41 is partially formed from mesh. More specifically, the screen drum 41 has a mesh region having a pattern corresponding to the shape of an electrode to be manufactured. Holes of the mesh are sized according to the particle size of the powdery electrode material 12P or 15P. The squeegee 42 smoothes and presses the electrode material 12P or 15P and electrostatically charges the electrode material 12P or 15P in order to apply the electrode material 12P or 15P to the drum 30D. The electrode material 12P or 15P in the screen drum 41 is thus electrostatically charged by the squeegee 42 and applied with a prescribed pattern to the drum 30D through the mesh of the screen drum 41, that is, the mesh region having a pattern corresponding to the shape of the electrode. The electrode material 12P or 15P thus applied to the drum 30D is transferred from the drum 30D onto the electrolyte membrane 11 (or the membrane of the diffusion layer 13 or 16), whereby the catalyst layer 12, 15 is formed. The electrolyte membrane 11 (or the membrane of the diffusion layer 13 or 16) is then fed between a pair of heated drums 35 in order to fix the transferred electrode material 12P or 15P to the electrolyte membrane 11 (or the membrane of the diffusion layer 13 or 16). The fixing section and the applying section disposed upstream of the fixing section are retained in an inert gas atmosphere 36.

In the seventeenth embodiment of the invention, the electrostatically charged electrode material 12P or 15P is applied to the drum by the method of screen and squeegee type. In other words, particles of the electrode material are applied to the drum 30D through the mesh. Therefore, particles having uniform size are applied to the drum 30D, and lumps of the carbon powder are not applied to the drum 30D. Moreover, since the screen drum 41 is rotating during the process, the electrode material 12P or 15P is fluidized within the screen drum 41 in an excellent manner.

Eighteenth Embodiment (a powdery electrode material is applied directly to the membrane by a method of screen and squeegee type)

As shown in FIG. 21, the eighteenth embodiment of the invention uses a screen drum 41 and a squeegee 42. The screen drum 41 is partially formed from mesh. More specifically, the screen drum 41 has a mesh region having a pattern corresponding to the shape of an electrode to be manufactured. Holes of the mesh are sized according to the particle size of the powdery electrode material 12P or 15P. The squeegee 42 smoothes and presses the electrode material 12P or 15P so as to apply the electrode material 12P or 15P to the electrolyte membrane 11 (or the membrane of the diffusion layer 13 or 16). The whole surface of the electrolyte membrane 11 (or the membrane of the diffusion layer 13 or 16) is electrostatically charged by a charging roller 31 disposed upstream of the screen drum 41. The electrode material 12P or 15P in the screen drum 41 is applied with a prescribed pattern directly to the electrolyte membrane 11 (or the membrane of the diffusion layer 13 or 16) through the mesh of the screen drum 41, that is, the mesh region having a pattern corresponding to the shape of the electrode. The electrolyte membrane 11 (or the membrane of the diffusion layer 13 or 16) is then fed between a pair of heated drum 35 in order to fix the electrode material 12P or 15P to the electrolyte membrane 11 (or the membrane of the diffusion layer 13 or 16). The fixing section and the applying section disposed upstream of the fixing section are retained in an inert gas atmosphere 36.

In the eighteenth embodiment of the invention, the electrode material 12P or 15P is applied to the electrolyte membrane 11 (or the membrane of the diffusion layer 13 or 16) by the method of screen and squeegee type. In other words, particles of the electrode material 12P or 15P are applied to the electrolyte membrane 11 (or the membrane of the diffusion layer 13 or 16) through the mesh. Therefore, particles having uniform size are applied to the electrolyte membrane 11 (or the membrane of the diffusion layer 13 or 16), and lumps of the carbon powder are not applied to the electrolyte membrane 11 (or the membrane of the diffusion layer 13 or 16). Moreover, since the screen drum 41 is rotating during the process, the electrode material 12P or 15P is fluidized within the screen drum 41 in an excellent manner.

Nineteenth Embodiment (membrane is reinforced by a backing film)

Figure 22:
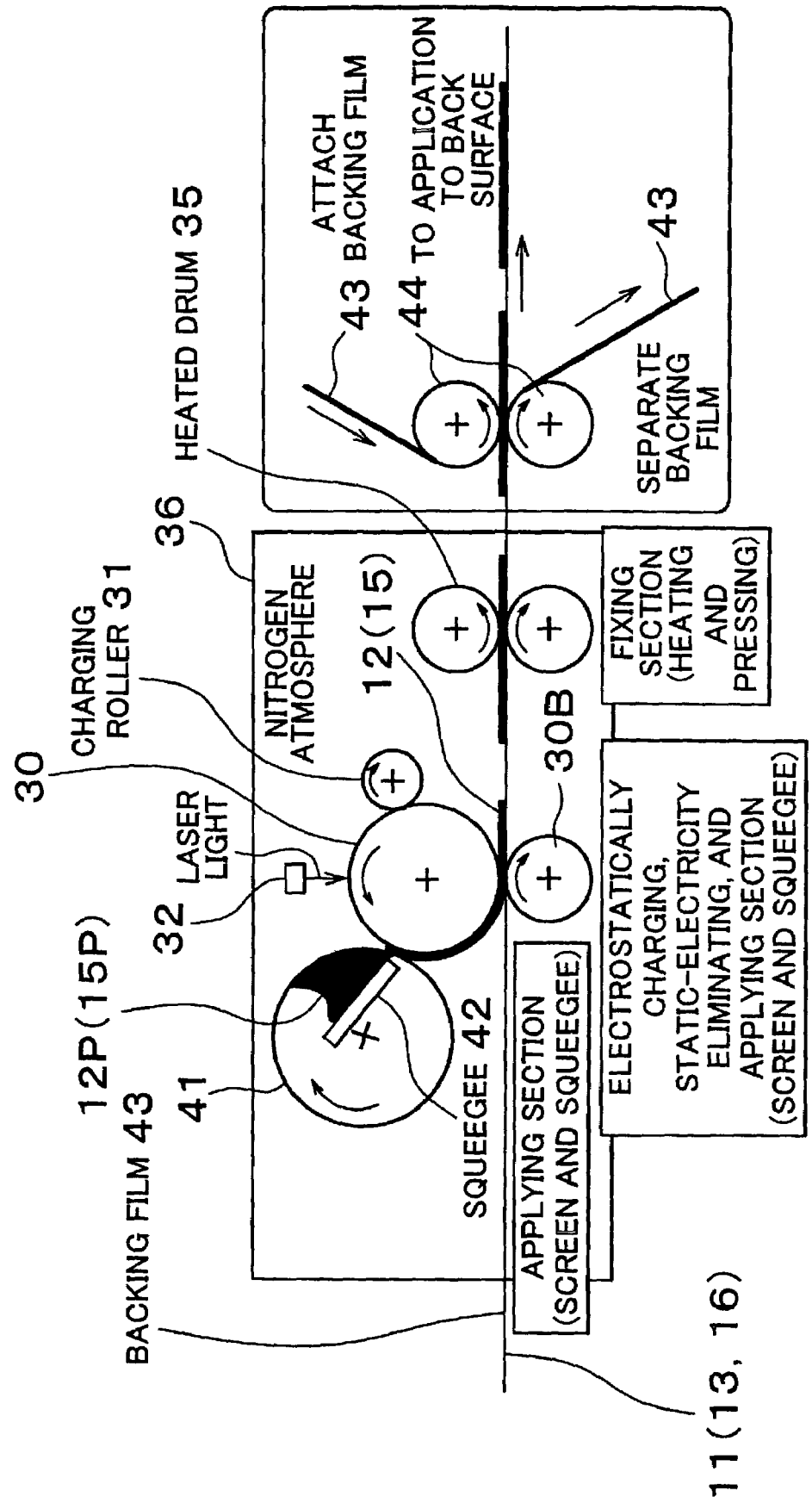
FIG. 22 is a side view of an apparatus for manufacturing a fuel cell electrode, which implements a method for manufacturing a fuel cell electrode according to a nineteenth embodiment of the invention.

As shown in FIG. 22, in the nineteenth embodiment of the invention, the electrolyte membrane 11 (or the membrane of the diffusion layer 13 or 16) is reinforced by a backing film 43. After the powdery electrode material 12P or 15P is applied to the reinforced electrolyte membrane 11 (or the membrane of the diffusion layer 13 or 16), the backing film 43 is separated from the electrolyte membrane 11 (or the membrane of the diffusion layer 13 or 16). The nineteenth embodiment is otherwise the same as the other embodiments of the invention. The embodiment illustrated in FIG. 22 is based on the embodiment of FIG. 18 (it should be noted that the nineteenth embodiment may be based on any embodiment other than the embodiment of FIG. 18).

At a position upstream of the electrode-material applying section, the backing film 43 is attached to the surface of the electrolyte membrane 11 (or the membrane of the diffusion layer 13 or 16) opposite to the surface to which the electrode material is to be applied in order to reinforce the electrolyte membrane 11 (or the membrane of the diffusion layer 13 or 16). In this state, the electrode material is applied to one surface of the reinforced electrolyte membrane 11 (or the membrane of the diffusion layer 13 or 16) (i.e., the surface opposite to the surface having the backing film attached thereto). The electrolyte membrane 11 (or the membrane of the diffusion layer 13 or 16) is then fed between a pair of heated drums 35 in order to fix the electrode material to the electrolyte membrane 11 (or the membrane of the diffusion layer 13 or 16). The backing film 43 is then separated from the electrolyte membrane 11 (or the membrane of the diffusion layer 13 or 16) along one drum of a pair of drums 44 disposed downstream of the heated drums 35. At the same time, another film 43 is attached to the opposite surface of the electrolyte membrane 11 (or the membrane of the diffusion layer 13 or 16) (i.e., the surface having the electrode material applied thereto) along the other drum 44 in order to reinforce the electrolyte membrane 11 (or the membrane of the diffusion layer 13 or 16). The electrolyte membrane 11 (or the membrane of the diffusion layer 13 or 16) thus reinforced is further fed to another electrode-material applying section disposed downstream, where the electrode material is applied to the other surface of the electrolyte membrane 11 (or the membrane of the diffusion layer 13 or 16) (i.e., the surface having no electrode material applied thereto). The electrolyte membrane 11 (or the membrane of the diffusion layer 13 or 16) is then fed between another pair of heated drums in order to fix the electrode material to the electrolyte membrane 11 (or the membrane of the diffusion layer 13 or 16). The film 43 is then separated from the electrolyte membrane 11 (or the membrane of the diffusion layer 13 or 16) along a drum disposed downstream of the pair of heated drums. In order to hold charges reliably, it is desirable to use an electrically insulating film such as PTFE (polytetrafluoroethylene) or polyethylene as the backing film 43.

Attaching the backing film 43 to the electrolyte membrane 11 (or the membrane of the diffusion layer 13 or 16) enables reinforcement of the electrolyte membrane 11 (or the membrane of the diffusion layer 13 or 16) and improvement in electrostatic application efficiency.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

For example, the electrode material may be first transferred from the photosensitive drum onto an intermediate medium membrane and then transferred from the intermediate medium membrane onto the electrolyte membrane or the membrane of the diffusion layer.

The rotary element of the invention includes a drum and a roller, and may have a hollow or solid cylindrical shape.

What is claimed is:

1. A method for manufacturing a fuel cell electrode, comprising:
    applying a powdery electrode material to a rotary element with a prescribed pattern, wherein the powdery electrode material is contained in a screen drum whose surface is at least partially formed from mesh, and a squeegee provided within the screen drum presses the electrode material against the rotary element in order to apply the electrode material to the rotary element through the mesh region of the screen drum;
    transferring the applied electrode material from the rotary element onto a target membrane; and
    fixing the transferred electrode material to the target membrane.

2. The method according to claim 1, wherein the electrode material is vibrated or fluidized within a container containing the electrode material.

3. The method according to claim 2, further comprising:
    applying a liquid binder to the fixed electrode material and drying the applied liquid binder, after fixing the electrode material to the target membrane.

4. The method according to claim 3, wherein a surface of the rotary element is charged with the prescribed pattern, and the electrode material is supplied to the rotary element so as to be electrostatically attached to a charged region of the rotary element, whereby the electrode material is applied to the rotary element.

5. The method according to claim 4, further comprising:
    charging the surface of the rotary element; and
    eliminating static electricity from the surface of the rotary element other than the region corresponding to the prescribed pattern.

6. The method according to claim 4, wherein
    the rotary element is a photosensitive drum,
    a charging roller is brought into contact with the photosensitive drum to charge a surface of the photosensitive drum,
    light is directed to the surface of the photosensitive drum other than a region corresponding to the prescribed pattern in order to remove static electricity therefrom, and
    the electrode material is supplied to the photosensitive drum so as to be electrostatically attached to the region corresponding to the prescribed pattern.

7. The method according to claim 3, wherein the fixing is conducted with a prescribed pressure and prescribed heat.

8. The method according to claim 3, wherein the electrode material is applied to the target membrane a plurality of times in order to vary a structure of the electrode in a thickness direction.

9. The method according to claim 3, wherein the applying the electrode material to the rotary element, transferring the applied electrode material from the rotary element onto the target membrane, and fixing the transferred electrode material to the target membrane are conducted in an inert gas atmosphere.

10. The method according to claim 3, wherein
    the electrode material is a powdery material mainly containing at least one of a mixture of carbon powder carrying a catalytic substance thereon and electrolyte powder, and carbon powder carrying a catalytic substance thereon and having its surface coated with an electrolyte.

11. The method according to claim 3, wherein the target membrane is one of an electrolyte membrane and a membrane of a diffusion layer.

12. The method according to claim 11, wherein
the target membrane is the electrolyte membrane,
the rotary element includes a first drum that transfers anode electrode material onto a first surface of the electrolyte membrane, and a second drum that transfers cathode electrode material onto a second surface of the electrolyte membrane,
the anode electrode material and the cathode electrode material are electrostatically held on the first drum and the second drum with prescribed patterns, respectively,
the anode electrode material of the prescribed pattern is transferred from the first drum onto the first surface of the electrolyte membrane,
the cathode electrode material of the prescribed pattern is transferred from the second drum onto the second surface of the electrolyte membrane, and
the anode and cathode electrode materials of the prescribed patterns thus transferred are fixed to the electrolyte membrane.

13. The method according to claim 1, wherein
a whole outer peripheral surface of the screen drum is formed from mesh, and the surface of the screen drum is charged with the prescribed pattern, and
the squeegee presses the electrode material contained in the screen drum against the rotary element in order to apply the electrode material to a charged region of the rotary element.

14. The method according to claim 1, wherein
the screen drum has a region of the prescribed pattern formed from mesh,
a whole surface of the rotary element is charged, and
the squeegee presses the electrode material contained in the screen drum in order to apply the electrode material to the rotary element through the mesh of the region of the prescribed pattern in the screen drum.

15. The method according to claim 1, wherein
the screen drum has a region of the prescribed pattern formed from mesh,
the rotary element is not charged, and
the squeegee presses the electrode material contained in the screen drum and electrostatically charges the electrode material in order to apply the electrode material to the rotary element through the mesh of the region of the prescribed pattern in the screen drum.

16. The method according to claim 1, wherein the fixing is conducted with a prescribed pressure and prescribed heat.

17. The method according to claim 1, wherein the electrode material is applied to the target membrane a plurality of times in order to vary a structure of the electrode in a thickness direction.

18. The method according to claim 1, wherein the applying the electrode material to the rotary element, transferring the applied electrode material from the rotary element onto the target membrane, and fixing the transferred electrode material to the target membrane are conducted in an inert gas atmosphere.

19. The method according to claim 1, further comprising applying a liquid binder to the fixed electrode material and drying the applied liquid binder, after fixing the electrode material to the target membrane.

20. The method according to claim 1, wherein
the electrode material is a powdery material mainly containing at least one of a mixture of carbon powder carrying a catalytic substance thereon and electrolyte powder, and carbon powder carrying a catalytic substance thereon and having its surface coated with an electrolyte.

21. The method according to claim 1, wherein the target membrane is one of an electrolyte membrane and a membrane of a diffusion layer.

22. The method according to claim 21, wherein
the target membrane is the electrolyte membrane,
the rotary element includes a first drum that transfers anode electrode material onto a first surface of the electrolyte membrane, and a second drum that transfers cathode electrode material onto a second surface of the electrolyte membrane,
the anode electrode material and the cathode electrode material are electrostatically held on the first drum and the second drum with prescribed patterns, respectively,
the anode electrode material of the prescribed pattern is transferred from the first drum onto the first surface of the electrolyte membrane,
the cathode electrode material of the prescribed pattern is transferred from the second drum onto the second surface of the electrolyte membrane, and
the anode and cathode electrode materials of the prescribed patterns thus transferred are fixed to the electrolyte membrane.

23. The method according to claim 1, wherein
the rotary element is a photosensitive drum, and the powdery electrode material is applied to the photosensitive drum with the prescribed pattern by (1) charging a surface of the photosensitive drum by bringing a charging roller into contact with the photosensitive drum to charge a surface of the photosensitive drum, (2) directing light to the charged surface of the photosensitive drum other than a region corresponding to the prescribed pattern in order to remove static electricity from the surface, so that the surface is charged with the prescribed pattern, wherein an intensity of the light is varied depending on regions of an exposure pattern, and (3) supplying the electrode material from the screen drum to the photosensitive drum so as to be electrostatically attached to a charged region of the photosensitive drum; and further comprising:
applying a liquid binder to the fixed electrode material and drying the applied liquid binder, after fixing the electrode material to the target membrane.

24. An apparatus for manufacturing a fuel cell electrode, comprising:
a first transfer section including a rotary element and an applying device that applies a powdery electrode material with a prescribed pattern to a surface of the rotary element, the rotary element transfers the applied electrode material to a target membrane, wherein the applying device includes a screen drum whose surface is at least partially formed from mesh, and a squeegee that is provided within the screen drum and presses the electrode material contained in the screen drum; and
a fixing section including a fixing device that fixes the transferred electrode material to the target membrane.

25. The apparatus according to claim 24, wherein
a whole outer peripheral surface of the screen drum is formed from mesh,
the rotary element is a photosensitive drum, and the applying device includes a charging roller that charges the photosensitive drum, and a projector that charges the photosensitive drum with the prescribed pattern.

26. The apparatus according to claim 24, wherein
the screen drum has a region of the prescribed pattern formed from mesh,
the apparatus further comprising:
a charging roller that charges the rotary element.

27. The apparatus according to claim 24, wherein
the screen drum has a region of the prescribed pattern formed from mesh,
the rotary element is a non-charged drum, and
the squeegee electrostatically charges the electrode material contained in the screen drum.

28. The apparatus according to claim 24, wherein the first transfer section and the fixing section are provided in an inert gas atmosphere.

29. The apparatus according to claim 24, wherein
the rotary element is a photosensitive drum, and the applying device further includes a charging roller that charges the surface of the photosensitive drum, and a projector that projects light onto the surface of the photosensitive drum other than a region corresponding to the prescribed pattern in order to eliminate static electricity from the surface of the photosensitive drum other than the region corresponding to the prescribed pattern, wherein the projector varies an intensity of the light depending on regions of an exposure pattern, the screen drum supplies the electrode material to a surface of the photosensitive drum, and the first transfer section further includes a member that allows the target membrane to be fed between the member and the photosensitive drum and presses the target membrane against the photosensitive drum so that the photosensitive drum transfers the applied electrode material to the target membrane, the member is one of a drum and a roller;
the fixing device includes a fixing roller provided downstream of the photosensitive drum in the feeding direction of the target membrane, the fixing roller fixes the transferred electrode material to the target membrane; and further comprising:
a binder supply device provided downstream of the fixing roller in a feeding direction of the target membrane; and
a drying section provided downstream of the binder supply device,
wherein the target membrane is one of an electrolyte membrane and a membrane of a diffusion layer.

30. The apparatus according to claim 24, further comprising:
a binder supply device provided downstream of the fixing section in the feeding direction of the target membrane; and
a drying section provided downstream of the binder supply device.

31. The apparatus according to claim 30, wherein
the electrode material is vibrated or fluidized within a container that holds the electrode material.

32. The apparatus according to claim 31, wherein:
the applying device further includes a charging device that charges the surface of the rotary element, and a static-electricity eliminating device that eliminates static electricity from the surface of the rotary element other than the region corresponding to the prescribed pattern, and
the first transfer section includes a member that allows the target membrane to be fed between the member and the rotary element and presses the target membrane against the rotary element,
wherein the target membrane is one of an electrolyte membrane and a membrane of a diffusion layer.

33. The apparatus according to claim 32, wherein
the rotary element is a first photosensitive drum,
the applying device includes a first material supply roller that supplies the electrode material to a surface of the first photosensitive drum,
the charging device is a first charging roller that charges the surface of the first photosensitive drum,
the static-electricity eliminating device is a first projector that projects light onto the surface of the first photosensitive drum other than a region corresponding to the prescribed pattern in order to eliminate static electricity therefrom,
the member is one of a first drum and a first roller that allows the target membrane to be fed between the first drum or the first roller and the first photosensitive drum and presses the target membrane against the first photosensitive drum, and
the fixing section is a fixing roller provided downstream of the first photosensitive drum in the feeding direction of the target membrane, and fixes the electrode material to the target membrane
wherein the target membrane is one of the electrolyte membrane and the membrane of the diffusion layer.

34. The apparatus according to claim 33, further comprising:
a second transfer section provided downstream of the first transfer section in the feeding direction of the target membrane, and including a second photosensitive drum, a second charging roller that charges a surface of the second photosensitive drum, a second projector that projects light onto the surface of the second photosensitive drum other than a region corresponding to the prescribed pattern in order to eliminate static electricity therefrom, a second material supply roller that supplies electrode material to the surface of the second photosensitive drum, and one of a second drum and a second roller that allows the target membrane to be fed between the one of the second drum and the second roller and the second photosensitive drum and presses the membrane against the second photosensitive drum,
wherein the target membrane is one of the electrolyte membrane and the membrane of the diffusion layer.

35. The apparatus according to claim 33, wherein
the member is a second photosensitive drum,
the target membrane is the electrolyte membrane and is interposed between the first photosensitive drum and the second photosensitive drum,
the apparatus further comprising:
a second charging roller that charges a surface of the second photosensitive drum;
a second projector that projects light onto the surface of the second photosensitive drum other than a region corresponding to the prescribed pattern in order to eliminate static electricity therefrom; and
a second material supply roller that supplies electrode material to the surface of the second photosensitive drum.

36. The apparatus according to claim 31, wherein the first transfer section and the fixing section are provided in an inert gas atmosphere.

37. A method for manufacturing a fuel cell electrode, comprising:
pressing a powdery electrode material contained in a screen drum whose surface is at least partially formed from mesh by using a squeegee provided within the screen drum, thereby directly applying the electrode material with a prescribed pattern to a target membrane through the mesh region of the screen drum; and
fixing the applied electrode material to the target membrane.

38. The method according to claim 37, wherein the fixing the applied electrode material to the target membrane is conducted with a prescribed pressure and prescribed heat.

39. The method according to claim 37, wherein the electrode material is applied to the target membrane a plurality of times in order to vary a structure of the electrode in a thickness direction.

40. The method according to claim 37, wherein applying the electrode material to the screen drum, and fixing the applied electrode material to the target membrane are conducted in an inert gas atmosphere.

41. The method according to claim 37, further comprising applying a liquid binder to the fixed electrode material and drying the applied liquid binder, after fixing the electrode material to the target membrane.

42. The method according to claim 37, wherein
the electrode material is a powdery material mainly containing at least one of a mixture of carbon powder carrying a catalytic substance thereon and electrolyte powder, and carbon powder carrying a catalytic substance thereon and having its surface coated with an electrolyte.

* * * * *